(12) United States Patent
Tan et al.

(10) Patent No.: US 9,918,313 B2
(45) Date of Patent: Mar. 13, 2018

(54) SPECTRUM ALLOCATION FOR BASE STATION

(71) Applicant: Microsoft Technology Licensing, LLC., Redmond, WA (US)

(72) Inventors: Kun Tan, Beijing (CN); Jiansong Zhang, Beijing (CN); Yongguang Zhang, Beijing (CN); Ranveer Chandra, Bellevue, WA (US); Yong He, Beijing (CN); Thomas Moscibroda, Beijing (CN); Paramvir Bahl, Bellevue, WA (US); Haichen Shen, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 128 days.

(21) Appl. No.: 14/587,512

(22) Filed: Dec. 31, 2014

(65) Prior Publication Data

US 2015/0117386 A1  Apr. 30, 2015

Related U.S. Application Data

(63) Continuation of application No. 13/202,297, filed as application No. PCT/CN2011/073647 on May 4, 2011, now Pat. No. 8,929,933.

(51) Int. Cl.
*H04W 4/00* (2009.01)
*H04W 72/04* (2009.01)
(Continued)

(52) U.S. Cl.
CPC ....... *H04W 72/0453* (2013.01); *H04L 5/0005* (2013.01); *H04L 5/0023* (2013.01);
(Continued)

(58) Field of Classification Search
USPC ........ 370/210, 329, 343, 312, 314, 345, 478
See application file for complete search history.

(56) References Cited

U.S. PATENT DOCUMENTS 5,099,417 A   3/1992  Magar et al.
5,212,777 A   5/1993  Gove et al.
(Continued)

FOREIGN PATENT DOCUMENTS

CN   1973492   5/2007
CN   101385361   3/2009
(Continued)

OTHER PUBLICATIONS

Japanese Office Action dated Jul. 21, 2015 for Japanese patent application No. 2014-508666, a counterpart foreign application of U.S. Appl. No. 13/202,297, 4 pages.
(Continued)

*Primary Examiner* — Phuongchau Ba Nguyen
(74) *Attorney, Agent, or Firm* — Schwegman Lundberg & Woessner, P.A.

(57) ABSTRACT

Embodiments include processes, systems, and devices that allow a white space base station to request available frequency ranges for white space transmission in a local area. A white space finder service models a primary user device's transmission signal propagation area using terrain data associated with the local area of the primary user device. The white space finder service also determines, based on the location of the white space base station and the modeled propagation area, one or more locally available, non-interfering frequency ranges and provides them to the white space base station. The white space base station compares the provided frequency ranges to policies and selects one or more of the available frequencies that accommodate the policies. The white space base station also maps the transmission frequency ranges to virtual frequency ranges for
(Continued)

transmission by a software-defined radio employing spectrum virtualization.

17 Claims, 12 Drawing Sheets

(51) Int. Cl.
- H04W 16/14 (2009.01)
- H04W 72/08 (2009.01)
- H04W 88/08 (2009.01)
- H04L 5/00 (2006.01)
- H04L 27/00 (2006.01)
- H04L 5/14 (2006.01)

(52) U.S. Cl.
CPC ........ *H04L 5/0092* (2013.01); *H04L 27/0006* (2013.01); *H04W 16/14* (2013.01); *H04W 72/0446* (2013.01); *H04W 72/082* (2013.01); *H04W 88/08* (2013.01); H04L 5/0064 (2013.01); H04L 5/0066 (2013.01); H04L 5/14 (2013.01)

(56) References Cited

U.S. PATENT DOCUMENTS

| | | |
|---|---|---|
| 5,708,593 A | 1/1998 | Saby et al. |
| 5,784,640 A | 7/1998 | Asghar et al. |
| 5,930,298 A | 7/1999 | Choi |
| 6,061,555 A * | 5/2000 | Bultman ............ H04B 7/12 370/497 |
| 6,114,971 A | 9/2000 | Nysen |
| 6,167,031 A | 12/2000 | Olofsson et al. |
| 6,182,030 B1 | 1/2001 | Hagen et al. |
| 6,188,702 B1 | 2/2001 | Tornetta et al. |
| 6,298,035 B1 | 10/2001 | Heiskala |
| 6,298,370 B1 | 10/2001 | Tang et al. |
| 6,351,499 B1 | 2/2002 | Paulraj et al. |
| 6,377,783 B1 * | 4/2002 | Lo .................. H01Q 3/26 342/373 |
| 6,415,415 B1 | 7/2002 | Karabed |
| 6,557,062 B1 | 4/2003 | Shaler et al. |
| 6,578,153 B1 | 6/2003 | Sankey et al. |
| 6,587,671 B1 | 7/2003 | Kanago et al. |
| 6,654,428 B1 | 11/2003 | Bose et al. |
| 6,665,311 B2 | 12/2003 | Kondylis et al. |
| 6,735,448 B1 | 5/2004 | Krishnamurthy et al. |
| 6,748,034 B2 | 6/2004 | Hattori et al. |
| 6,785,904 B1 | 8/2004 | Franken et al. |
| 6,788,702 B1 | 9/2004 | Garcia-Luna-Aceves et al. |
| 6,825,827 B2 | 11/2004 | Miura |
| 6,864,715 B1 | 3/2005 | Bauer et al. |
| 6,895,512 B1 | 5/2005 | Calbucci |
| 6,963,579 B2 | 11/2005 | Suri |
| 7,016,325 B2 | 3/2006 | Beasley et al. |
| 7,072,818 B1 | 7/2006 | Beardslee et al. |
| 7,142,617 B2 | 11/2006 | Mohan |
| 7,162,204 B2 | 1/2007 | Hansen et al. |
| 7,174,145 B2 | 2/2007 | Chatelier et al. |
| 7,230,978 B2 | 6/2007 | Bitterlich et al. |
| 7,287,077 B2 | 10/2007 | Haugh et al. |
| 7,404,074 B2 | 7/2008 | Murotake |
| 7,444,168 B2 | 10/2008 | Nakagawa et al. |
| 7,565,140 B2 | 7/2009 | Levy et al. |
| 7,610,017 B2 | 10/2009 | Girardeau, Jr. et al. |
| 7,650,525 B1 | 1/2010 | Chang et al. |
| 7,738,913 B2 | 6/2010 | Hilpisch et al. |
| 7,774,017 B2 | 8/2010 | Irita et al. |
| 7,894,556 B2 | 2/2011 | Casabona et al. |
| 7,933,598 B1 | 4/2011 | Agrawal et al. |
| 7,974,176 B2 | 7/2011 | Zheng |
| 8,406,331 B2 | 3/2013 | Orfanos et al. |
| 8,526,412 B2 | 9/2013 | Vijayan et al. |
| 8,526,529 B2 * | 9/2013 | Ahn ................ H04L 5/0037 370/210 |
| 8,553,521 B2 | 10/2013 | Zhang et al. |
| 8,929,933 B2 * | 1/2015 | Tan ................ H04W 16/14 455/130 |
| 2001/0046225 A1 * | 11/2001 | Schwaller ........ H04W 88/08 370/343 |
| 2002/0126704 A1 | 9/2002 | Cam et al. |
| 2002/0155811 A1 | 10/2002 | Prismantas et al. |
| 2003/0086366 A1 | 5/2003 | Branlund et al. |
| 2003/0196132 A1 | 10/2003 | Chiang |
| 2004/0068730 A1 | 4/2004 | Miller et al. |
| 2004/0153957 A1 | 8/2004 | Feldman et al. |
| 2004/0156449 A1 | 8/2004 | Bose et al. |
| 2004/0185887 A1 | 9/2004 | Wolman et al. |
| 2004/0252684 A1 | 12/2004 | Evans et al. |
| 2005/0124330 A1 | 6/2005 | Hong et al. |
| 2005/0135308 A1 | 6/2005 | Vijayan et al. |
| 2005/0202848 A1 | 9/2005 | Chang |
| 2005/0202858 A1 | 9/2005 | Farber et al. |
| 2006/0015674 A1 | 1/2006 | Murotake |
| 2006/0109925 A1 | 5/2006 | Kannan et al. |
| 2006/0115012 A1 | 6/2006 | Sadowsky et al. |
| 2006/0145897 A1 | 7/2006 | Kadono et al. |
| 2006/0168587 A1 | 7/2006 | Aslam-Mir |
| 2006/0190904 A1 | 8/2006 | Haji-Aghajani et al. |
| 2006/0212624 A1 | 9/2006 | Kim |
| 2006/0227856 A1 | 10/2006 | Ledvina et al. |
| 2007/0002898 A1 | 1/2007 | Boariu et al. |
| 2007/0076649 A1 | 4/2007 | Lin et al. |
| 2007/0083786 A1 | 4/2007 | Chiang |
| 2007/0092018 A1 | 4/2007 | Fonseka et al. |
| 2007/0155429 A1 | 7/2007 | Levy et al. |
| 2007/0178841 A1 | 8/2007 | Oliynyk et al. |
| 2007/0202816 A1 | 8/2007 | Zheng |
| 2007/0247139 A1 | 10/2007 | Veroni et al. |
| 2008/0003949 A1 | 1/2008 | Voonna et al. |
| 2008/0043668 A1 | 2/2008 | Chen et al. |
| 2008/0095100 A1 | 4/2008 | Cleveland et al. |
| 2008/0095135 A1 | 4/2008 | Cleveland |
| 2008/0098133 A1 | 4/2008 | Shaanan et al. |
| 2008/0130519 A1 | 6/2008 | Bahl et al. |
| 2008/0165754 A1 | 7/2008 | Hu |
| 2008/0175421 A1 | 7/2008 | Chizari |
| 2008/0178062 A1 | 7/2008 | Norris et al. |
| 2008/0232487 A1 | 9/2008 | Cleveland et al. |
| 2008/0256606 A1 | 10/2008 | Koikara et al. |
| 2008/0261639 A1 | 10/2008 | Sun et al. |
| 2008/0261650 A1 | 10/2008 | Piriyapoksombut et al. |
| 2008/0268892 A1 | 10/2008 | Hamdi et al. |
| 2008/0300006 A1 | 12/2008 | Rofougaran et al. |
| 2008/0320529 A1 | 12/2008 | Louchkoff et al. |
| 2009/0034457 A1 | 2/2009 | Bahl et al. |
| 2009/0061783 A1 | 3/2009 | Choi et al. |
| 2009/0063057 A1 | 3/2009 | Miettinen |
| 2009/0088104 A1 | 4/2009 | Cheng et al. |
| 2009/0089556 A1 | 4/2009 | Lee et al. |
| 2009/0110033 A1 | 4/2009 | Shattil |
| 2009/0119570 A1 | 5/2009 | Eder et al. |
| 2009/0156129 A1 | 6/2009 | Hassan et al. |
| 2009/0160486 A1 | 6/2009 | Lee |
| 2009/0175381 A1 | 7/2009 | Bougard |
| 2009/0190537 A1 | 7/2009 | Hwang et al. |
| 2009/0196180 A1 | 8/2009 | Bahl et al. |
| 2009/0197627 A1 | 8/2009 | Kuffner et al. |
| 2009/0204725 A1 | 8/2009 | Liu et al. |
| 2009/0232234 A1 | 9/2009 | Du |
| 2009/0235316 A1 | 9/2009 | Wu et al. |
| 2009/0253376 A1 | 10/2009 | Parssinen et al. |
| 2009/0258603 A1 | 10/2009 | Ghaboosi et al. |
| 2009/0298522 A1 | 12/2009 | Chaudhri et al. |
| 2009/0312028 A1 | 12/2009 | Burchfiel |
| 2009/0323600 A1 | 12/2009 | Chandra et al. |
| 2010/0014603 A1 | 1/2010 | Palanki et al. |
| 2010/0031098 A1 | 2/2010 | Kobayashi |
| 2010/0048234 A1 | 2/2010 | Singh |
| 2010/0075704 A1 | 3/2010 | McHenry et al. |
| 2010/0159855 A1 | 6/2010 | Hardacker et al. |
| 2010/0232369 A1 | 9/2010 | Jing et al. |
| 2010/0246377 A1 | 9/2010 | Zhang et al. |
| 2010/0246506 A1 | 9/2010 | Krishnaswamy |

(56) References Cited

U.S. PATENT DOCUMENTS

| | | |
|---|---|---|
| 2010/0260137 A1 | 10/2010 | Vrzic et al. |
| 2010/0262420 A1 | 10/2010 | Herre et al. |
| 2010/0301992 A1 | 12/2010 | Chandra et al. |
| 2010/0304678 A1 | 12/2010 | Chandra et al. |
| 2010/0309317 A1* | 12/2010 | Wu .................. H04W 16/14 348/180 |
| 2010/0309806 A1 | 12/2010 | Wu et al. |
| 2011/0096658 A1 | 4/2011 | Yang et al. |
| 2011/0116458 A1 | 5/2011 | Hsu et al. |
| 2011/0122855 A1 | 5/2011 | Henry |
| 2011/0123028 A1 | 5/2011 | Karabinis |
| 2011/0134861 A1 | 6/2011 | Seo et al. |
| 2011/0135016 A1 | 6/2011 | Ahn et al. |
| 2011/0188486 A1 | 8/2011 | Kim et al. |
| 2011/0228666 A1 | 9/2011 | Barbieri et al. |
| 2012/0096498 A1 | 4/2012 | Wu et al. |
| 2014/0051467 A1 | 2/2014 | Tan et al. |

FOREIGN PATENT DOCUMENTS

| | | | | |
|---|---|---|---|---|
| CN | 101399557 A | | 4/2009 | |
| CN | 101399930 A | | 4/2009 | |
| CN | 101415226 | | 4/2009 | |
| GB | 2282286 A | * | 3/1995 | ............ H04L 27/34 |
| JP | 2007088941 A | | 4/2007 | |
| JP | 2008503958 A | | 2/2008 | |
| JP | 2008306665 | | 12/2008 | |
| JP | 2009515468 A | | 4/2009 | |
| JP | 2009118320 | | 5/2009 | |
| KR | 20080036534 | | 4/2008 | |
| KR | 20080098263 | | 11/2008 | |
| WO | WO9901945 A1 | | 1/1999 | |
| WO | WO2006000955 | | 1/2006 | |
| WO | WO2006083495 A2 | | 8/2006 | |
| WO | WO2007053121 A1 | | 5/2007 | |
| WO | WO2009018300 A1 | | 2/2009 | |
| WO | WO2010057302 A1 | | 5/2010 | |
| WO | WO2010142021 A1 | | 12/2010 | |
| WO | WO2011015960 A1 | | 2/2011 | |

OTHER PUBLICATIONS

Translated Chinese Office Action dated Feb. 14, 2016 for Chinese patent application No. 201210452650.0, a counterpart foreign application of U.S. Appl. No. 13/294,039, 6 pages.

European Office Action dated Feb. 8, 2016 for European Patent Application 12846996.2, a counterpart foreign application of U.S. Appl. No. 13/294,039, 5 pages.

European Search Report dated Jan. 18, 2016 for European patent application No. 118464689.2, 3 pages.

Murty, et al., "SenseLess: A Database-Driven White Spaces Network", Microsoft Research Technical Report MSR-TR-2010-127, Sep. 20, 2010, pp. 1-21, retrieved from the internet on Aug. 10, 2011 at http://citeseerx.ist.psu.edu/viewdoc/download?doi=10.0.0.204.7071&rep=rep1&type=pdf.

Office action for U.S. Appl. No. 12/571,188 dated Jan. 7, 2016, Tan et al., "Radio Control Board for Software-Defined Radio Platform", 37 pages.

Tan, et al., "Spectrum Virtualization Layer", Jan. 31, 2011, retrieved from the internet at http://msr-waypoint.com/pubs/154410/main-svl.pdf, retrieved on Dec. 19, 2015.

Chinese Office Action dated Jun. 20, 2016 for Chinese Patent Application No. 201210452650.0, a counterpart foreign application of U.S. Appl. No. 13/294,039, 21 pages.

Chinese Office Action dated Jun. 20, 2016 for Chinese patent application No. 201180070594.8, a counterpart foreign application of U.S. Pat. No. 8,929,933, 12 pages.

Translated Japanese Office Action dated Jun. 7, 2016 for Japanese Patent Application No. 2014-541278, a counterpart foreign application of U.S. Pat. No. 9,130,711, 6 pages.

Office action for U.S. Appl. No. 12/571,188, dated May 10, 2016, Tan et al., "Radio Control Board for Software-Defined Radio Platform", 33 pages.

European Office Action dated Jul. 2, 2015 for European patent application 12846996.2, a counterpart foreign application of U.S. Appl. No. 13/294,039, 5 pages.

Supplemental European Search Report dated Jun. 25, 2015 for European Patent Application No. 12846996.2, 3 pages.

Office action for U.S. Appl. No. 12/571,188, dated Jun. 10, 2015, Inventor #1, "Radio Control Board for Software-Defined Radio Platform", 30 pages.

Translated Chinese Office Action dated Jan. 7, 2015 for Chinese patent application No. 201080043940.9, a counterpart foreign application of U.S. Appl. No. 12/571,188, 6 pages.

Translated Chinese Office Action dated Dec. 1, 2014 for Chinese patent application No. 201210452650.0, a counterpart foreign application of U.S. Appl. No. 13/294,039, 6 pages.

Translated Japanese Office Action dated Nov. 25, 2014 for Japanese patent application No. 2014-508666, a counterpart foreign application of U.S. Appl. No. 13/202,297, 7 pages.

Translated Chinese Office Action dated Oct. 20, 2015 for Chinese patent application No. 201180070594.8, a counterpart foreign application of U.S. Appl. No. 13/202,297, 11 pages.

Translated Chinese Office Action dated Aug. 17, 2015 for Chinese patent application No. 201210452650.0, a counterpart foreign application of U.S. Appl. No. 13/294,039, 8 pages.

Korean Office Action dated Jan. 26, 2017 for Korean patent application No. 10-2013-7029117, a counterpart foreign application of U.S. Pat. No. 8,929,933.

Office Action for U.S. Appl. No. 12/571,188 dated Nov. 16, 2016, Tan et al., "Radio Control Board for Software-Defined Radio Platform", 37 pages.

"Office Action Issued in Korean Patent Application No. 10-2013-7029117", dated Jun. 27, 2017, 5 Pages.

Garroppo et al., "Notes on Implementing a IEEE 802.11s Mesh Point" slide presentation at 4th International Workshop of the EuroNGI/EuroFGI Network of Excellence, Barcelona, Spain, Jan. 16-18, 2008, 39 pages.

Gast, "802.11 Wireless Networks. The Definitive Guide," Second Edition, Apr. 2002, 436 pages.

Geier, "Enabling Fast Wireless Networks with OFDM." CommsDesign, Feb. 2001, 6 pages.

Ghosh, et al., "A Cognitive Radio Prototype Operating in UHF TV Bands," IEEE Symposia on New Frontiers in Dynamic Spectrum Access, Networks, Demonstrations and Experimentation, IEEE DySPAN 2008, Oct. 2008, retrieved at <<http://cms.comsoc.org/SitGen/Uploads/Public/Docs_DYSPAN_2008/Phillips_Demo_IEEDySPAN2008.pdf>>, 4 pages.

Glossner, et al., "A Software-Defined Communications Baseband Design", retrieved on Jun. 21, 2009 at <<http://ieeexplore.ieee.org/stamp/stamp.jsp?tp=&arnumber=1166669&isnumber=26307>>, IEEE Communications Magazine, Jan. 2003, pp. 120-128.

Glossner, et al., "The Sandbridge Sandblaster Convergence Platform", Sandbridge Technologies, Feb. 2009, 21 pgs.

"GNU Radio", retrieved on Jun. 19, 2009 at <<http://www.gnu.org/software/gnuradio/>>, 2 pages.

Gockler et al, "Parallelisation of Digital Signal Processing in Uniform and Reconfigurable Filter Banks for Satellite Communications," IEEE Asia Pacific Conference on Circuits and Systems, APCCAS 2006, Dec. 4-7, 2006, 4 pgs.

Goldsmith, Andrea Jo, "Design and Performance of High-Speed Communication Systems over Time-Varying Radio Channels", EEC S Department, University of CA, Berkeley, Technical Report No. UCB/ERL M94/75, published on Oct. 11, 2012 on 210 pages.

Goldsmith, "Wireless Communications", retrieved on Jun. 19, 2009 at <<http://assets.cambridge.org/97805218/37163/copyright/9780521837163_copyright.pdf>>, Cambridge University Press, 2005, 2 pages.

Govil, et al, "Comparing Algorithms for Dynamic Speed-Setting of a Low-Power CPU," TR-95-017, International Computer Science Institute, Apr. 1995, 13 pages.

Gummadi, et al, "Understanding and Mitigating the Impact of RF Interference on 802.11 Networks," SIGCOMM Proceedings of the

(56) References Cited

OTHER PUBLICATIONS

2007 Conference on Applications, Technologies, Architectures, and Protocols for Computer Communications; vol. 37, Issue 4, Oct. 2007; 14 pages.
Gurney et al., "Geo-location Database Techniques for Incumbent Protection in the TV White Space", IEEE, 978-1-4244-2017-9/08, Jun. 6, 2008, 9 pages.
Heusse, et al., "Performance of Anomaly of 802.11b," Proceedings of INFOCOMM 2003, Mar. 2003, 8 pages.
Holland, et al, "A Rate-Adaptive MAC Protocol for Multi-Hop Wireless Networks," IEEE International Conference on Mobile Computing and Networking (MOBICOM'01), Rome, Italy, Jul. 2001, 15 pages.
Horowitz, "The Art of Electronics, 2nd Edition," Cambridge University Press, Jul. 28, 1989, 469 pages.
"Host AP driver for Intersil Prism2/2.5/3, hostpad, and WPA Supplicant", retrieved on Jun. 19, 2009 at <<http://hostap.epitest.fi/>>, Mar. 23, 2009, 4 pages.
"IEEE 802.22 Working Group on WRANs" web page for IEEE 802 LAN/MAN Standards Committee, retrieved at http://www.ieee802.org/22/, retrieved on Mar. 31, 2009, 2 pages.
"IEEE DySpan 2008 Dynamic Spectrum Access Networks", IEEE Symposia on New Frontiers in Dynamic Spectrum Access Networks, Oct. 14-17, 2008, 13 pages.
Intel, "Differential Signaling", Introduction Reading Chapter 6, Dec. 2002, 69 pages.
International Search Report for Application No. PCT/US2010/036752 (corresponding to U.S. Appl. No. 12/473,951), dated Dec. 31, 2010, 9 pages.
International Search Report for Application No. PCT/US2010/036756 (corresponding to U.S. Appl. No. 12/473,963), dated Dec. 29, 2010, 9 pages.
Jamieson, et al., "PPR: Partial Packet Recovery for Wireless Networks", retrieved on Jun. 19, 2009 at <<http://nms.lcs.mit.edu/papers/fp315-jamieson.pdf>>, SIGCOMM '07, ACM, Kyoto, Japan, Aug. 27-31, 2007, 12 pages.
Jones, et al., "FCC Press Release, Evaluation of the Performance of Prototype TV-Band White Space Devices", Technical Research Branch Laboratory Division Office of Engineering and Technology Federal Communications Commission,, Oct. 15, 2008, pp. 149.
JP Notice of Rejection for Application No. 2012-513340, dated Mar. 26, 2013, 7 pages.
Translated Japanese Notice of Rejection for Japanese Application No. 2013-516700 dated Sep. 30, 2014, a counterpart foreign application of U.S. Appl. No. 12/822,218, 4 pgs.
Translated Japanese Notice of Rejection for Japanese Application No. 2012-513340 dated Mar. 26, 2014, a counterpart foreign application of U.S. Appl. No. 12/473,963, 7 pgs.
Translated Japanese Office Action for Japanese Application No. 2012-513342, dated Apr. 30, 2014, a counterpart foreign application of U.S. Appl. No. 12/473,963, 4 pgs.
Judd, et al, "Using Emulation to Understand and Improve Wireless Networks and Applications," NSD0I 2005 Proceedings of the 2nd Conference on Symposium on Networked Systems Design & Implementation—vol. 2, May 2005, 14 pages.
Kamerman, "WaveLan-II: A High-Performance Wireless LAN for the Unlicensed Band." Bell Labs Technical Journal, Aug. 1997. 16 pages.
Katabi, Dina, "The Use of IP Anycast for Building Efficient Multicast", Proceedings in Global Telecommunications Conference, Lab. for Computer Science, vol. 3, Dec. 5-9, 1999, pp. 1679-1688.
Katti, et al., "Embracing Wireless Interference: Analog Network Coding", retrieved on Jun. 19, 2009 at <<http://nms.lcs.mit.edu/~dina/pub/anc.pdf>>, SIGCOMM '07, ACM, Kyoto, Japan, Aug. 27-31, 2007, 12 pages.
Kim et al., "Fast Discovery of Spectrum Opportunities in Cognitive Radio Networks", Proceedings of the 3rd IEEE Symposium on New Frontiers in Dynamic Spectrum Access Networks, Oct. 14-17, 2008, 12 pages.
Kim, et al., "In-band Spectrum Sensing in Cognitive Radio Networks: Energy Detection or Feature Detection?", Proceedings of the 14th ACM international conference on Mobile computing and networking, Sep. 14-19, 2008, pp. 14-25.
Kim et al., "Low Power, High-Rate Viterbi Decoder Employing the SST (Scarce State Transition) Scheme and Radix-4 Trellis," Department of Electrical and Computer Engineering, Sungkyunkwan University, Feb. 2000, 4 pgs.
Kim et al., "Power Efficient Viterbi Decoder based on Pre-computation Technique for Portable Digital Multimedia Broadcasting Receiver", IEEE Transactions on Consumer Electronics, vol. 53, No. 2, May 2007, pp. 350-356.
Kotz, et al., "Analysis of a Campus-wide Wireless Network". In Proceedings of the Eighth Annual International Conference on Mobile Computing and Networking, MOBICOM'02, Sep. 23-26, 2002, pp. 107-118.
Lacage, et al., "IEEE 802.11 Rate Adaptation: A Practical Approach," MSWiM '04, Venezia, Italy, Oct. 2004, 9 pages.
Li et al, "A Frequency Hopping Spread Spectrum Transmission Scheme for Uncoordinated Cognitive Radios," IEEE International Conference on Acoustics, Speech and Signal Processing, ICASSP 2009, Taipei, Apr. 19-24, 2009, pp. 2345-2348.
Lin, et al., "IBM Research Report Wireless Base Station Design on General Purpose Processor with Multicore Technology", retrieved on Aug. 13, 2009 at <<http://domino.watson.ibm.com/library/cyberdig.nsf/papers/B4C36233C8280F27852575FD005991DF/$File/rc24823.pdf>>, IBM Research Division, China Research Laboratory, Electrical Engineering, RC24823, Jul. 14, 2009, 9 pgs.
Lin, et al., "SODA: A Low-power Architecture for Software Radio", retrieved on Jun. 19, 2009 at <<http://ieeexplore.ieee.org/stamp/stamp.jsp?tp=&arnumber=1635943>>, Proceedings of the 33rd International Symposium on Computer Architecture (ISCA 2006), IEEE, Jun. 2006, 12 pgs.
Lin, et al., "Software Defined Radio—A High Performance Challenge", retrieved on Jun. 19, 2009 at <<http://citeseerx.ist.psu.edu/viewdoc/download?doi=10.1.1.92.7327&rep=rep1&type=pdf>>, SDRG, Sep. 2006, pp. 1-41.
Liu, et al., "Sensing-based Opportunistic Channel Access", Mobile Networks and Applications, vol. 11, No. 4, Aug. 2006, pp. 1-28.
"Longley-Rice Methodology for Evaluating TV Coverage and Interference.", Retrieved at http://www.fcc.gov/Bureaus/Engineering_Technology/Documents/bulletins/oet69/oet69 .pdf, Feb. 6, 2004, pp. 15.
"Low-Voltage differential signaling", accessed on Apr. 21, 2011 <http://en.wikipedia.org/wiki/Low-voltage_differential_signaling>, 7 pages.
Shetty, "LVDS-Based SerDes for Video Interconnects", retrieved on Aug. 17, 2009 at <<http://www.epn-online.com/page/new51279>>, EPN, Electronic Product News, pp. 1-11.
Ma, "A Closter Look at LVDS Technology" Pericom, Apnote 41, Nov. 16, 2001. 3 pages.
Madwifi, retrieved on Jun. 19, 2009 at <<http://sourceforge.net/projects/madwifi>>, 1 page.
Matinmikko, et al., "Cognitive Radio: An intelligent Wireless Communication System", Retrieved at http://www.vtt.fi/inf/iulkaisut/muut/2008/CHESS _Research_Report.pdf, Mar. 14, 2008, pp. 155.
Microsoft Research, "WhiteFiService Home," retrieved from <<http://whitespaces.msresearch.us>> on Apr. 25, 2011, 2 pgs.
8b/10b encoding, accessed on Apr. 21, 2011 <http://en.wikipedia.org/wiki/8b/10B>, 9 pages.
Advanced Concept Engineering Corp., "Ultra High-Performance Viterbi Decoder Core ACIP Viterbi_K7-", retrieved at <<http://www.acengr.com/datasheet/ACIP_Viterbi_DataSheet.pdf>>on Aug. 11, 2009, pp. 1-8.
Aguayo, et al, "Link-level Measurements from an 802.11b Mesh Network," SIGCOMM '04, Portland, Oregon, Aug. 2004, 11 pages.
Alocci et al., "Development of an IEEE 802.11s Simulation Model for QualNet", NAEC2008/ATSMA Conference, Sep. 25-28, 2008, 9 pages.
Arslan, "Teaching SDR through a Laboratory Based Course with Modern Measurement and Test Instruments", retrieved from <<http://www.sdrforum.org/pages/sdr07/Proceedings/Papers/1.2/1.

(56) References Cited

OTHER PUBLICATIONS 2-3.pdf>>, Proceeding of the SDR 07 Technical Conference and Product Exposition, Nov. 5-9, 2007, 6 pgs.
In the matter of Unlicense Operation in the TV Broadcase Bands, "Order Granting Extension of Time", Federal Communications Commission, released: Dec. 22, 2004, pp. 2.
Bahl, et al, "Cell Breathing in Wireless LANs: Algorithms and Evaluation," IEEE Computer Society, Transactions on Mobile Computing, Feb. 2007 (vol. 6 Issue 2), 16 pages.
Bahl et al, "White Space Networking with Wi-Fi like Connectivity," SIGCOMM '09, Barcelona, Spain, Aug. 17-21, 2009, 12 pgs.
Balazinska, et al, "Characterizing Mobility and Network Usage in a Corporate Wireless Local-Area Network," Proceedings of the First Internation Conference on Mobile Systems, Applications and Services; San Francisco, CA, May 2003, 14 pages.
Bejerano, et al, "Fairness and Load Balancing in Wireless LANs Using Association Control," MobiCom'04, Sep. 2004, Philidelpia, Pennsylvania, 15 pages.
Bhatt, "Creating a PCI Express Interconnect", Intel Corporation, 2002, 8 pages, PCI Express White Paper.
Borth et al., "Considerations for Successful Cognitive Radio Systems in US TV White Space", Proceedings of the 3rd IEEE Symposium on New Frontiers in Dynamic Spectrum Access Networks, Oct. 14-17, 2008, 5 pages.
Bougard, et al., "A Coarse-Grained Array Accelerator for Software-Defined Radio Baseband Processing", retrieved on Jun. 19, 2009 at <<http://ieeexplore.ieee.org/stamp/stamp.jsp?tp=&arnumber=4626817&isnumber=4626808>>, IEEE Micro, Jul.-Aug. 2008, pp. 41-50.
Boyd-Wickizer, et al., "Corey: an operating system for many cores", retrieved on Jun. 19, 2009 at <<http://www.mit.edu/~y_z/papers/corey-osdi08.pdf>, pp. 1-14.
Broch et al., "A Performance Comparison of Multi-Hop Wireless Ad Hoc Network Routing Protocols", International Conference on Mobile Computing and Networking, Proceedings of the 4th annual ACM/IEEE international conference on Mobile computing and networking, Oct. 25-30, 1998, pp. 85-97.
Bruno, "High-Speed Wireless LANs: The Impact of Atheros Super G Proprietary Performance Mode on 802.11g Devices," The Tolly Group White Paper, Aug. 2004, 11 pages.
Burton, "16-Channel, DDR LVDS Interface with Per-Channel Alignment", retrieved on Aug. 13, 2009 at <<http://www.xilinx.com/support/documentation/application_notes/xapp855.pdf>>, XILINX, Application Note: Virtex-5 FPGAs, XAPP855, Oct. 13, 2006, pp. 1-43.
Cabric et al., "Experimental Study of Spectrum Sensing Based on Energy Detection and Network Cooperation", Proceedings of the First International Workshop on Technology and Policy for Accessing Spectrum, Aug. 5, 2006, 8 pages.
Camp, et al., "Measurement Driven Deployment of a Two-Tier Urban Mesh Access Network," MobiSys 06, Uppsala, Sweden, Jun. 2006, 14 pages.
Chandra et al, "A Case for Adapting Channel Width in Wireless Networks," In Proceedings of the ACM SIGCOMM '08 Conference on Data Communication, Aug. 17-22, 2008, Seattle, Washington, 12 pgs.
Chandra et al., "Wireless Networking in the TV Bands", retrieved at http://sdr08.cs.ucdavis.edu/sdr-workshop.ppt, Apr. 1, 2009, 34 pages.
Chu, et al., "A Case for End System Multicast", Proceedings of the 2000 ACM SIGMETRICS International Conference. 28, Issue 1, Jun. 2000, pp. 1-12.
Translated Chinese Notice on the Second Office Action for CN Application No. 201080024631.7, dated Jul. 11, 2014, a counterpart foreign application of U.S. Appl. No. 12/473,951, 8 pgs.
Translated Chinese Notice on the Second Office Action for CN Application No. 201080024619.6, dated Aug. 14, 2014, a counterpart foreign application of U.S. Appl. No. 12/473,963, 7 pgs.
Translated Chinese Notice on the First Office Action for CN Application No. 201080024631.7, dated Nov. 27, 2013, a counterpart foreign application of U.S. Appl. No. 12/473,951, 12 pgs.
Translated Chinese Notice on the First Office Action for CN Application No. 201080024619.6, dated Dec. 10, 2013, a counterpart foreign application of U.S. Appl. No. 12/473,963, 13 pgs.
Translated Chinese Office Action dated May 22, 2014 for Chinese patent application No. 201080043940.9, a counterpart foreign application of U.S. Appl. No. 12/571,188, 15 pages.
"Cognitive Radio Networks", retrieved at http://www.ece.gatech.edu/research/labs/bwn/CR/Projectdescription.html, retrieved on Apr. 1, 2009, 13 pages.
Cummings, et al., "FPGA in the Software Radio", retrieved on Jun. 19, 2009 at <<http://ieeexplore.ieee.org/stamp/stamp.isp?tp=&arnumber=747258>>, IEEE Communications Magazine, Feb. 1999, pp. 108-112.
Dandawate, et al., "Statistical Tests for Presence of Cyclostationarity", IEEE Transactions on Signal Processing, vol. 42, No. 9, Sep. 1994, pp. 2355-2369.
"GAO USB PC Based Oscilloscope (1Mega) Model A0130005", GAO Instruments Inc., retrieved from <<http://www.gaoinstruments.com/gao2902_usb_pc_based_oscilloscope_1mega-p-53.html>> on Aug. 13, 2009, 2 pgs.
Deb et al., "Dynamic Spectrum Access in DTV Whitespaces Design Rules, Architecture and Algorithms", ACM 978-1-60558-702-8/09/09, MobiCom '09, Sep. 20-25, 2009, 12 pages.
Delay Spread, JPL's Wireless Communication Reference Website. Last accessed May 1, 2008, 4 pages.
Do-Hyun Na, et al., "Policy Based Dynamic Channel Selection Architecture for Cognitive Radio Networks, Communications and Networking in China," Aug. 2007, pp. 1190-1194.
Dong et al., "Neural Networks Based Parallel Viterbi Decoder by Hybrid Design", Proceeding of the 5th World Congress on Intelligent Control and Automation, Jun. 15-19, 2004, pp. 1923-1926.
Dutta et al, "An Intelligent Physical Layer for Cognitive Radio Networks," Proceedings of the 4th Annual International Conference on Wireless Internet, WICON '08, Nov. 17-19, 2008, 9 pgs.
ElBatt, et al., "Power Management for Throughput Enhancement in Wireless Ad-Hoc Networks," <<http://cs.ucr.edu/~kris/icc1hri.pdf. Last accessed May 1, 2008, 9 pages.
Extended EP Search Report for EP Application No. EP10781356.0, dated Nov. 20, 2013, a counterpart foreign application of U.S. Appl. No. 12/473,963, 6 pgs.
Extended EP Search Report for EP Application No. EP11798778.4, dated Nov. 25, 2013, a counterpart foreign application of U.S. Appl. No. 12/822,218, 7 pgs.
Ethernet Frame, accessed on Apr. 21, 2011, <http://en.wikipedia.org/wiki/Ethernet_frame>, 6 pages.
"WBX," Ettus Research LLC, retreived from <<http://www.ettus.com/WBX>> on Apr. 25, 2011, 1 pg.
"Welcome to Ettus Research," Ettus Research LLC, retrieved from <<http://www.ettus.com>> on Apr. 25, 2011, 2 pgs.
Web page for Ettus Research LLC, "The USRP Product Family", Mountain View, California, retrieved at http://www.ettus.com, on Mar. 31, 2009, 2 pages.
Ettus Research LLC, "USRP FAQ", Mountain View, California, retrieved at http://www.ettus.com/faq.html, on Mar. 31, 2009, 7 pages.
"Building Software Radio Systems: The USRP Product Family," Ettus Research LLC, Mountain View, California, retrieved at <<http://www.ettus.com>>, retrieved on Aug. 8, 2009, 2 pages.
"FCC Adopts Rules for Unlicensed Use of Television White Spaces", news release from the Federal Communications Commission, Nov. 4, 2008, retrieved at hraunfoss.fcc.gov/edocs_public/attachmatch/DOC-286566A1.pdf, 2 pages.
FCC Media Bureau, "TVQ TV Database", Retrieved at http://www.fcc.gov/mb/video/tvq.html, Dec. 24, 2009, 2 pages.
"FCC Acts to Expedite DTV Transition and Clarify DTV Build-Out Rules", news release from the Federal Communications Commission, Nov. 8, 2001, 3 pages.
Final Office Action for U.S. Appl. No. 12/473,963, dated May 1, 2012, Ranveer Chandra, "Spectrum Assignment for Networks Over White Spaces and Other Portions of the Spectrum", 14 pgs.

(56) References Cited

OTHER PUBLICATIONS

Sawyer, "High-Speed Data Serialization and Deserialization (840 Mb/s LVDS)", retrieved on Aug. 13, 2009 at <<http://www.eetindia.co.in/ARTICLES/2002JUN/2002JUN28_AMD_NTEK_AN.PDF?SOURCES=DOWNLOAD>>, XILINX, Application Note: Virtex-II Family, XAPP265, Jun. 19, 2002, pp. 1-13.
Web page for Scalable Network Technologies, Inc., Los Angeles, California, retrieved at http://www.scalable-networks.com, retrieved on Mar. 31, 2009, 1 page.
Schmid, et al., "An Experimental Study of Network Performance Impact of Increased Latency in Software Defined Radios", retrieved on Jun. 19, 2009 at <<http://nesl.ee.ucla.edu/fw/thomas/wintech401-schmid.pdf>>, WiNTECH 2007, Networked and Embedded Systems Laboratory, Electrical Engineering Department, University of California, Los Angeles, Sep. 10, 2007, 8 pages.
Shah, et al., "Dynamic Bandwidth Management for Single-hop Ad Hoc Wireless Networks," Mobile Networks and Applications, Mar. 2005, 9 pages.
Shellhammer et al., "Technical Challenges for Cognitive Radio in the TV White Space Spectrum", ITA Conference, San Diego, CA, Feb. 8-13, 2009, 11 pages.
Shih, et al, "Wake on Wireless: An Event Driven Energy Saving Strategy for Battery operated Devices," MobiCom '02, Proceedings of the 8th annual international conference on Mobile Computing and networking, Sep. 2002, 12 pages.
Sprectrum Bridge, "Show My White Space", Retrieved at http://showmywhitespace.com/, Retrieved on Dec. 24, 2009, pp. 2.
"Shuttle Radar Topography Mission (SRTM)", Retrieved at http://www2.jpl.nasa.gov/srtm/, Retrieved Date: Dec. 24, 2009, pp. 2.
Siu et al., "A Robust Viterbi Algorithm Against Impulsive Noise with Application to Speech Recognition", IEEE Transactions on Audio, Speech, and Language Processing, vol. 14, No. 6, Nov. 2006, pp. 2122-2133.
"Skyhook Wireless", Retrieved at http://skyhookwireless.com/, Retrieved Date: Dec. 24, 2009, pp. 6.
"SLX Wireless Systems Specifications," SHURE Incorporated, Niles, Illinois, retreived at <<http://www.fullcompass.com/common/files/3227-SLX-Series%20Shure%20specs.pdf>>retreived on Aug. 8, 2009, 3 pages.
"Small Form Factor SDR Development Platform", retrieved on Jun. 19, 2009 at <<http://www.kanecomputing.co.uk/lyrtech_sff_sdr_dev_platform.htm>, Kane Computing Ltd., 2 pgs.
Smirnov et al, "The Use of Spectral Analysis in Identifying Applications Runny on Enterprise Data Center Systems," CMG Computer Measurement Group, retrieved from <<http://www.cmg.org/measureit/issues/mit62/m_62_11.html>>, Aug. 2009, 6 pgs.
"Software Radio," Microsoft Research, retreived from <<http://research.microsoft.com/sora>> on Apr. 25, 2011, 3 pgs.
"Software-Defined Radio System", National Instruments, retrieved at <<http://zone.ni.com/devzone/cda/tut/p/id/8787>>, May 26, 2009, 5 pgs.
Stevenson et al (posted by Peter Murray), "TV Whitespace Petition for Reconsideration Input from 802.22 to 802.18," IEEE P802.22, Jan. 2009, pp. 1-10.
Stirling, "White Spaces—the New Wi-Fi?", International Journal of Digital Television, vol. 1, No. 1, Feb. 2010, pp. 16.
Subramani, et al., "Spectrum Scanning and Reserve Channel Methods for Link Maintenance in Cognitive Radio Systems", Proceedings of the 67th IEEE Vehicular Technology Conference, VTC, May 11-14, 2008, pp. 1944-1948.
Suzuki et al, "Proposal of Band-Limited Divided-Spectrum Single Carrier Transmission for Dynamic Spectrum Controlled Access in ISM Band," Personal, Indoor and Mobile Radio Communications, 2009 IEEE 20th International Symposium, Sep. 3-16, 2009, pp. 132-136.
System Packet Interface Level 4 (SPI-4) Phase 2 Revision 1: OC-192 System Interface for Physical and Link Layer Devices, Optical Internetworkig Forum, Oct. 15, 2003, 72 pages.
Tan et al., "SORA: High Performance Software Radio Using General Purpose Multi-core Processors", Proceedings of the 6th USENIX Symposium of Networked Systems Design and Implementation, Apr. 1, 2009, 16 pages.
Tan, et al., "Sora: High Performance Software Radio Using General Purpose Multi-Core Processors", retrieved on Aug. 13, 2009 at <<http://www.usenix.org/event/nsdi09/tech/slides/tan.pdf>>, NSDI, 2009, pp. 1-27.
Tandra et al., "SNR Wall for Signal Detection", IEEE Journal of Selected Topics in Signal Processing, vol. 2, No. 1, Feb. 2008, pp. 4-17.
Tang, et al, "Analysis of a Local-Area Wireless Network," MobiCom '00; Proceedings of the 6th Annual International Conference on Mobile Computing and Networking, Boston, Massachusetts, Aug. 2000, 10 pages.
Tennenhouse, et al., "SpectrumWare—A Software-Oriented Approach to Wireless Signal Processing", retrieved at <<http://citeseerx.ist.psu.edu/viewdoc/download;jsessionid=D99E57C2A2A3CEEF89F66CBA544F774F?doi=10.1.1.17.9618&rep=rep1&type=pdf>>, Telemedia Networks and Systems Group Laboratory for Computer Science, MIT, Nov. 1995, pp. 1-15.
Texas Instruments, "Texas Instruments, 10-MHz to 66-MHz, 10:1 LVDS Serializer/Deserializer", <http://www.ti.com>, Sep. 2004, 29 pages.
"The ITS Irregular Terrain Model Algorithm, NTIA, Department of Commerce.", Retrieved at http://flattop.its.bldrdoc.gov/itm.html, Retrieved Date: Dec. 24, 2009, pp. 2.
Agarwal et al, "The KILL Rule for Multicore", ACM, DAC 2007, San Diego, California, Jun. 4-8, 2007, pp. 750-753.
"Think Beyond the Box—A Software-Defined Approach to RF Test", National Instruments, retrieved from at <<http://zone.ni.com/devzone/cda/pub/p/id/750>>, May 13, 2009, 4 pages.
Trachewsky, et al, "Broadcom WLAN Chipset for 802.11a/b/g," Broadcom Corporation, CA, USA, Aug. 17, 2003, 42 pages.
Tsou, et al., "Latency Profiling for SCA Software Radio", retrieved at <<http://www.sdrforum.org/pages/sdr07/Proceedings/Papers/2.2/2.2-1.pdf>>, SDR Forum Technical Conference 2007, Nov. 2007, 6 pgs.
"TV Fool", Retrieved at http://www.tvfool.com/, Retrieved Date: Dec. 24, 2009, pp. 2.
Web page For "TV Fool", retrieved at http://www.tvfool.com, retrieved on Mar. 31, 2009, 4 pages.
Urkowitz, "Energy Detection of Unknown Deterministic Signals", Proceedings of the IEEE, vol. 55, No. 4, Apr. 1967, pp. 523-531.
"Using Flexible-LVDS I/O Pins in APEX II Devices", retrieved at <<http://www.altera.com/literature/an/an167.pdf>>, Altera Corporation, Application Note 167, ver 1.1, Aug. 2002, pp. 1-14.
"USRP—Frequently Asked Questions," GNU Radio, the GNU Software Radio, retrieved at <<http://gnuradio.org/trac/wiki/UsrpFAQ>>, retrieved on Aug. 8, 2009, 1 page.
Verdu, "Multiuser Detection", retrieved on Jun. 22, 2009 at <<http://www.cambridge.org/US/catalogue/catalogue.asp?isbn=0521593735>>, Aug. 1998, 2 pages.
Wang et al, "List-Coloring Based Channel Allocation for Open-Spectrum Wireless Networks," IEEE, 2005, pp. 690-694.
"WARP: Wireless Open Access Research Platform", retrieved on Jun. 19, 2009 at <<http://warp.rice.edu/trac>>, Rice University, 2 pgs.
"Waveform Creator has Object-Oriented GUI Optimized for MIMO", Keithley Instruments, Inc., retrieved from <<http://news.thomasnet.com/fullstory/545867>>, Jun. 30, 2008, 8 pgs.
Weiser, et al., "Scheduling for Reduced CPU Energy," OSDI '94 Proceedings of the 1st USENIX Conference on Operating Systems Design and Implementation, Nov. 1994, 11 pages.
Whitt, Richard., "Introducing the White Spaces Database Group", Retrieved at http:// googlepublicpolicy.blogspot.com/2009/02/introducing-white-spaces-database-group.html, Feb. 4, 2009, pp. 4.
WiMax Forum. www.wimaxforum.org. Last accessed May 1, 2008, 2 pages.
Wormsbecker, "On Channel Selection Strategies for Multi-Channel MAC Protocols in Wireless Ad Hoc Networks," IEEE International Conference on Wireless and Mobile Computing, Networking and Communications, Jun. 2006, pp. 212-220.

(56) References Cited

OTHER PUBLICATIONS

Wu, et al., "A Novel Software Radio Platform Based on General PC and Network", International Conference on Wireless Communications, Networking and Mobile Computing, WiCOM 2006, Sep. 22-24, 2006, pp. 1-4.

Yang et al, "Supporting Demanding Wireless Applications with Frequency-agile Radios," Proceedings of 7th USENIX Symposium on Networked Systems Design and Implementation (NSDI 2010), San Jose, California, Apr. 2010, pp. 1-15.

Yuan, et al, "Allocationg Dynamic Time-Spectrum Blocks in Cognitive Radio Networks," 8th ACM International Symposium on Mobile ad hoc networking and computing, Montreal, Quebec, Canada, Sep. 2007, 10 pages.

Yuan, et al., "KNOWS: Kognitiv Networking Over White Spaces", IEEE Dynamic Spectrum Access Networks (DySPAN), Apr. 2007, pp. 12.

Zaki et al, "LTE Wireless Virtualization and Spectrum Management," 2010 Third Joint IFIP, Wireless and Mobile Networking Conference (WMNC), Budapest, Oct. 13-15, 2010, 6 pgs.

Minden, et al., "KUAR: A Flexible Software-Defined Radio Development Platform", retrieved on Jun. 19, 2009 at <<http://www.ittc.ku.edu/publications/documents/minden2007_dyspan07.pdf>>, 2nd IEEE International Symposium on New Frontiers in Dynamic Spectrum Access Networks, Dublin, Apr. 17-20, 2007, 12 pages.

Mishra et al., "How much white space is there?", Technical Report No. UCB/EECS-2009-3, Jan. 11, 2009, 16 pages.

Mishra, Mobi-Com Poster Abstract: Client-driven Channel Management for Wireless LANs, Mobile Computing and Communications Review, vol. 10, No. 4, Oct. 2006, pp. 8-10.

Mishra, "Weighted Coloring Based Channel Assignment in WLANs," Mobile Computing and Communications Review, Jul. 2005, 12 pages.

Mody et al, "Machine Learning Based Cognitive Communications in White as Well as the Gray Space," IEEE, 2007, pp. 1-7.

Moscibroda et al., "Load-Aware Spectrum Distribution in Wireless LANs", IEEE International Conference on Network Protocols, Oct. 19-22, 2008, pp. 137-146.

Na et al, "Policy-based Dynamic Channel Selection Architecture for Cognitive Radio Networks," Communications and Networking in China, 2007, CHINACOM '07, Aug. 22-24, 2007, 5 pgs.

Narlanka et al, "A Hardware Platform for Utilizing TV Bands With a Wi-Fi Radio," 15th IEEE Workshop on Local & Metropolitan Area Networks, LANMAN 2007, New York, NY, Jun. 10-13, 2007, 5 pgs.

Neel, et al., "A Formal Methodology for Estimating the Feasible Processor Solution Space for a Software Radio", retrieved on Jun. 19, 2009 at <<http://www.sdrforum.org/pages/sdr05/1.2%20Reconfigurable%20Hardware/1.2-03%20Neel%20et%20al.pdf>>, Proceeding of the SDR 2005 Technical Conference and Product Exposition, SDR, Nov. 2005, 6 pages.

Nekovee, Maziar., "Quantifying the TV White Spaces Spectrum Opportunity for Cognitive Radio Access", First International ICST Conference, EuropeComm, Aug. 11-13, 2009, pp. 46-57.

Neufeld, et al., "SoftMAC—Flexible Wireless Research Platform", retrieved on Jun. 19, 2009 at <<http://conferences.sigcomm.org/hotnets/2005/papers/grunwald.pdf>>, Department of Computer Science, University of Colorado, Boulder, Nov. 4, 2005, pp. 1-6.

National Geophysical Data Center, "The Global Land One-Km Base Elevation Project (GLOBE),", Retrieved at <<http://www.ngdc.noaa.gov/mgg/topo/globe.html>>, Retrieved Date: Dec. 24, 2009, pp. 2.

NYCwireless Testimony for NY City Council Hearing: The Regulation and Use of the Unallocated Portion of the Radio Spectrum, Also Known as White Spaces, NYC Wireless New Yourk City Council Testimony on White Space, Posted on Sep. 29, 2009, 4 pages.

Office action for U.S. Appl. No. 12/571,188, dated Jan. 14, 2014, Tan, et al., "Radio Control Board for Software-Defined Radio Platform", 23 pages.

Office Action for U.S. Appl. No. 12/631,548, dated Jan. 10, 2012, Kun Tan, "Analyzing Wireless Technologies Based on Software-Defined Radio", 8 pgs.

Office Action for U.S. Appl. No. 13/294,039, dated Oct. 16, 2014, He et al., "Mapping Signals from a Virtual Frequency Band to Physical Frequency Bands", 11 pages.

Office action for U.S. Appl. No. 12/571,188, dated Oct. 25, 2012, Tan et al., "Radio Control Board for Software-Defined Radio Platform", 23 pages.

Office action for U.S. Appl. No. 12/630,774, dated Oct. 9, 2012,Tan et al., "High Performance Digital Signal Processing in Software Radios", 5 pages.

Office action for U.S. Appl. No. 12/535,415, dated Nov. 21, 2012, Tan et al., "Software-Defined Radio Using Multi-Core Processor", 14 pages.

Office Action for U.S. Appl. No. 12/473,963, dated Nov. 9, 2011, Ranveer Chandra, "Spectrum Assignment for Networks Over White Spaces and Other Portions of the Spectrum", 12 pgs.

Office action for U.S. Appl. No. 13/294,093, dated Dec. 5, 2013, He, et al., "Mapping a Transmission Stream in a Virtual Baseband to a Physical Baseband with Equalization", 14 pages.

Office Action for U.S. Appl. No. 12/535,415, dated Apr. 11, 2012, Kun Tan, "Software-Defined Radio Using Multi-Core Processor", 15 pgs.

Office Action for U.S. Appl. No. 12/630,774, dated Apr. 12, 2012, Kun Tan, "High Performance Digital Signal Processing in Software Radios", 9 pgs.

Office action for U.S. Appl. No. 12/535,415, dated Apr. 8, 2013, Tan et al., "Software-Defined Radio Using Multi-Core Processor", 26 pages.

Office Action for U.S. Appl. No. 12/571,188, dated May 28, 2014, Tan et al., "Radio Control Board for Software-Defined Radio Platform", 30 pages.

Office action for U.S. Appl. No. 12/571,188, dated Jun. 6, 2012, Tan et al., "Radio Control Board for Software-Defined Radio Platform", 18pages.

Office action for U.S. Appl. No. 12/631,548, dated Jul. 2, 2012, Tan et al., "Analyzing Wireless Technologies Based on Software-Defined Radio", 7 pages.

Office Action dated Dec. 10, 2013 in China Patent Application CN201080024619.6, filed May 28, 2010, by Applicant Microsoft Corporation, translated, 13 pages.

Ogilvie, "Clock Solutions for Wi-Fi" (IEEE 802.11), Perocom Semiconductor; www.pericom.com/pdf/applications/AN070.pdf; Sep. 5, 2003, 4 pages.

Otsason et al., "Accurate GSM Indoor Localization", UbiComp Sep. 11-14, 2005, LNCS vol. 3660, 2005, pp. 141-158.

Park et al, "Frequency-Domain Channel Estimation and Equalization for Continuous-Phase Modulations With Superimposed Pilot Sequences," IEEE Transactions on Vehicular Technology, vol. 58, No. 9, Nov. 2009, pp. 4903-4908.

"Part 11: Wireless LAN Medium Access Control (MAC) and Physical Layer (PHY) Specifications", retrieved on Jun. 19, 2009 at <<http://www.csse.uwa.edu.au/adhocnets/802.11-1999.pdf>>, ANSI/IEEE Std 802.11, 1999 Edition, pp. i-xiv and 1-512.

"PCI Express 2.0 Specification Released", CD Info, retrieved from <<http://www.cdrinfo.com/sections/news/Details.aspx?NewsId=19512>>, Jan. 16, 2007, 1 pg.

PCT International Search Report and Written Opinion for PCT Application No. PCT/US2010/049013 dated May 13, 2011, 9 pgs.

PCT International Search Report and Written Opinion for PCT Application No. PCT/US2010/036752 dated May 13, 2011, 9 pgs.

PCT International Search Report and Written Opinion for PCT Application No. PCT/US2010/036756 dated May 13, 2011, 9 pgs.

PCT International Search Report and Written Opinion for PCT Application No. PCT/US2011/041302, dated Dec. 28, 2011, 9 pgs.

PCT Search Report and Written Opinon for PCT/US2012/064249 dated Mar. 29, 2013, 10 pages.

Plummer Jr., et al., "A Cognitive Spectrum Assignment Protocol Using Distributed Conflict Graph Construction", In Proceedings IEEE MILCOM, Oct. 2007, pp. 1-7.

Proakis, "Digital Communications," McGraw Hill, Aug. 2000, 937 pages.

(56) References Cited

OTHER PUBLICATIONS

Radio Magazine, "FCC Adopts Rules for Unlicensed Use of Television White Spaces", Retrieved at http://radiomagonline.com/currents/news/fcc-adopts-rules-unlicensed-white-spaces-1105/ , Nov. 5, 2008, pp. 4.
"Radio Technology from Full Spectrum used in White Space," Radio Electronics.com, retrieved from <<http://www.radio-electronics.com/news/radio-receivers/radio-technology-from-full-spectrum-used-48>>, Sep. 22, 2010, 2 pgs.
Rahul et al, "Learning to Share: Narrowband-Friendly Wideband Networks," In Proceedings of the ACM SIGCOMM '08 Conference on Data Communication, Aug. 17-22, 2008, Seattle, Washington, 12 pgs.
Ratnasamy et al., "Revisiting IP Multicast", ACM, 1-59593-308-5/06/0009, SigComm '06, Sep. 11-15, 2006, 12 pages.
Rix et al., "Perceptual Evaluation of Speech Quality (PESQ)—A New Method for Speech Quality Assessment of Telephone Networks and Codecs", Proceedings of the 2001 IEEE International Conference Acoustics, Speech and Signal Processing, vol. 2, May 7-11, 2001, 4 pages.
Rosum Corporation, "Reliable, In-Building", Retrieved at http://rosum.com/, Retrieved Date: Dec. 24, 2009, pp. 1.
"Rt2x00Wiki", retrieved on Jun. 19, 2009 at <<http://rt2x00.serialmonkey.com>>, last updated Apr. 12, 2009, 3 pages.
Rules 70(2) and 70a(2) EPC Communication and Supplemental European Search Report dated Dec. 6, 2013 in EPO Patent Application 10781356.0 (PCT/US2010/036756) filed May 28, 2010, by Applicant Microsoft Corporation, 7 pages.
Sahai et al., Spectrum Sensing Fundamental Limits and Practical Challenges, IEEE Symposium on New Frontiers in Dynamic Spectrum Access Networks, Nov. 8-11, 2005 138 pages.
Savvopoulos, et al., "A Software-Radio Test-bed for Measuring the Performance of DVB-S2 Receiver Circuits", 10th International Workshop on Signal Processing for Space Communications, SPSC '08, Oct. 6-8, 2008, 7 pgs.

* cited by examiner

SPECTRUM ALLOCATION FOR BASE STATION

CROSS REFERENCE TO RELATED APPLICATIONS

This application is a continuation of U.S. patent application Ser. No. 13/202,297, filed on Aug. 18, 2011, which is a 35 U.S.C. 371 National Stage Application of International Application No. PCT/CN2011/073647, filed May 4, 2011, the entire contents of which are incorporated herein by reference.

BACKGROUND

White space frequency bands are frequency bands allocated to television (TV) broadcasting service and to wireless microphone service, but not used in a local geographic area. Recent Federal Communication Commission (FCC) rules allow unlicensed access to white space frequency bands in the United States as long as such access does not interfere with TV and wireless microphone transmission (i.e., "incumbent" or "primary user" access to the frequency bands). Non-U.S. jurisdictions may also in the future implement similar provisions for access to television frequency bands. Available white space frequency bands may have variable bandwidths, and they may be non-contiguous and location-specific. These aspects make white space transmission networks different from conventional wireless transmission networks. Conventional wireless solutions utilize hardware chips for data transmission. Such hardware chips are limited to certain physical layer and media access control protocols, as well as certain transmission frequency bands. Hard-coded protocols cannot utilize non-contiguous frequency bands. Furthermore, supporting both long and short-distance white space transmission requires either multi-protocol chips or multiple hard-coded chips.

BRIEF SUMMARY

This Summary is provided in order to introduce simplified concepts of resource download policy generation, which are further described below in the Detailed Description. This summary is not intended to identify essential features of the claimed subject matter, nor is it intended for use in determining the scope of the claimed subject matter.

In embodiments, a spectrum manager of a white space base station requests and receives one or more available frequency bands for transmission in the local area of the white space base station. The spectrum manager compares the available frequency bands to one or more policies, such as regulatory policies or technical requirements, and selects some or all of the available frequency bands that match the policies. The spectrum manager also maps the available frequency bands to one or more virtual frequency bands, such as for use by a software-defined radio employing spectrum virtualization. A spectrum virtualization module of the white space base station maps a virtual baseband presented to a physical layer of a wireless protocol to a physical baseband associated with the selected physical frequency bands. Data modulated by the physical layer of the wireless protocol according to a virtual frequency band is transmitted on the selected physical frequency band.

A white space finder service receives requests for available frequency bands and utilizes terrain data to model an area over which transmissions of one or more primary user transmission devices are likely to propagate. Based on the modeled propagation areas as well as locations and channels employed by primary user transmission devices, the white space finder service selects one or more frequency bands that are non-interfering with primary users and available in the local area of the white space base station.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
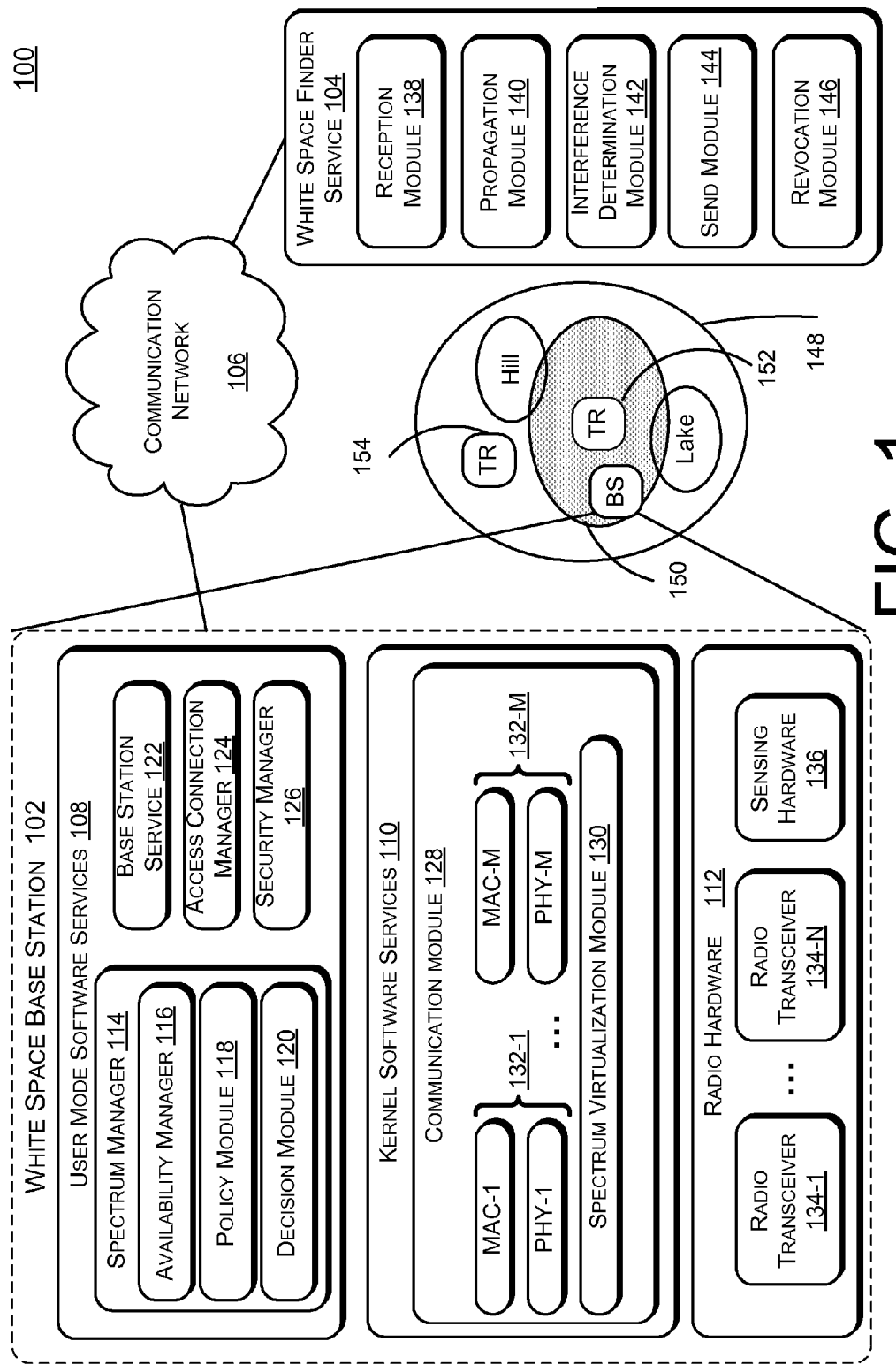
FIG. 1 is a schematic diagram of an example environment usable to allocate white space spectrum for transmission by a white space base station.

As discussed above, the availability of white space frequency bands is location-specific. The present disclosure therefore includes processes, systems, and devices for allocating white space frequency bands for white space base stations based at least on the location of the white space base station, regulatory policies, and/or transmission requirements of the white space base station. Also, as mentioned above, white space frequency ranges may be non-contiguous and variable. Thus, embodiments utilize a software-defined radio for more flexible white space transmissions. Some embodiments may utilize Microsoft® Research Software Radio (SORA) platform to implement the software-defined radio.

In one aspect of the present disclosure, a white space finder service provides data to white space base stations regarding available white space frequency bands that may be utilized without causing interference with primary users (such as television transmitters or licensed wireless microphones). The white space finder service may be a web-based service able to provide location-specific information about spectrum availability to white space base stations. Information regarding the locations of primary user transmitters that are near the white space base station is combined with terrain data to determine a geographic area that wireless transmissions of one or more primary user transmitters are likely to propagate. Based on the determined geographic propagation areas, as well as the location of the white space base station, the white space finder service determines available white space frequency bands for use by the white space base station. The propagation area and interference determinations may be modeled, in various embodiments, using one of various propagation models such as the Longley-Rice radio signal propagation model. The white space finder service selects white space frequency ranges that are not likely to interfere with primary users.

Without utilizing terrain data and propagation models to determine the signal propagation area of the primary users, a relatively conservative estimate of the propagation area would have to be made in order to be reasonably certain that white space base station transmissions do not interfere with primary users. Using propagation modeling may increase the sizes of the geographical areas within which white space devices are able to utilize white space frequency bands without sacrificing the non-interference requirement of white space frequency transmission. This may increase the availability of white space frequency transmissions generally.

In another aspect of the present disclosure, a spectrum manager of a white space base station determines one or more physical transmission frequency bands of white space spectrum to use for transmissions. The spectrum manager receives information about one or more locally available, non-interfering white space frequency transmission bands from a white space finder service. The spectrum manager determines which of the one or more physical transmission frequency bands are to be used for transmission based on regulatory policies, technical requirements of the transmission, and characteristics of the available transmission bands.

Regulatory policies include FCC or other regulatory agency regulations. Non-limiting examples of regulatory policies include time of day, duration of availability, guard band requirements, transmission power level limits, and other types of policies. Technical requirements for transmission may be specific to a wireless transmission protocol that is utilized for the transmission. Non-limiting examples of technical requirements include bandwidth requirements, transmission power requirements, duplex transmission, simplex transmission, and so forth. The spectrum manager may compare the available physical frequency bands to the technical requirements and select one or more of the available physical frequency bands that allow the transmissions to comply with the policy requirements.

In another aspect of the present disclosure, the spectrum manager maps one or more physical transmission bands (selected for white space transmission) to one or more "virtual" transmission bands that are utilized by a wireless transmission protocol of the white space base station. For example, the white space base station may employ conventional wireless transmission protocols (such as Wi-Fi®, protocols within the 802.11 suite of protocols, code division multiple access (CDMA) based protocols, carrier sense multiple access (CSMA) based protocols, time division multiple access (TDMA) based protocols, and others), or combinations thereof. Such conventional wireless transmission protocols may not support variable or non-contiguous frequency transmissions, and such conventional wireless transmission protocols may have requirements for transmissions on specific frequency bands that differ from the selected white space frequency bands. Some embodiments may therefore utilize a communications module to generate modulated baseband signals on "virtual" frequency bands (i.e., virtual baseband signals) that correspond to the frequency bands according to the conventional wireless transmission protocols. Various embodiments may also utilize a spectrum virtualization layer, as is described elsewhere within this Detailed Description, to shape the virtual baseband signals into physical baseband signals for radio transmission according to the selected physical frequency bands in the white space spectrum. The spectrum manager, upon selection of the available physical transmission frequency bands, maps the physical transmission frequency bands to the virtual frequency bands. The spectrum virtualization layer enforces the mapping.

To support the mapping of a virtual frequency band to a physical transmission band that is a different size, the spectrum virtualization layer uses a virtual clock so that the wireless protocol can be used to transmit at a slower or faster rate than is associated with the fixed frequency band specified by the wireless protocol. To support mapping of a virtual frequency band to an equal-sized physical spectrum band, a virtual clock is used in some but not all embodiments. To support the mapping of a virtual frequency band to non-contiguous physical transmission bands, the spectrum virtualization layer employs splitters to split up signals for transmission, and mixers to combine received signals during reception.

Embodiments also include wireless clients configured to communicate with a wireless base station, such as a white space base station. Wireless clients may also include a spectrum virtualization layer that behaves in a same or similar way as the spectrum virtualization layer in a base station. A spectrum manager of a wireless client may be configured to map virtual transmission frequency bands to one or more physical transmission frequency bands, and the spectrum virtualization layer of the wireless client may be configured to enforce this mapping.

Although various embodiments may be described herein as being related to "white space" transmissions, "white space" networks, "white space" base stations, and "white space" clients, embodiments of the present disclosure are not limited to white space environments. Rather, embodiments include transmissions, networks, base stations, environments, and clients that are usable and/or compatible with any of various Dynamic Spectrum Access (DSA) networks. Embodiments refer to "white space" networking for the sake of discussion, and such references should not be taken in a limiting way.

The processes, systems, and devices described herein may be implemented in a number of ways. Example implementations are provided below with reference to the following figures.

Example Environment for Frequency Allocation

FIG. 1 is a schematic diagram of an example environment 100 usable to allocate spectrum, such as white space spectrum, for transmission by a base station, such as a white space base station. Environment 100 may include white space base station 102 and white space finder service 104. White space base station 102 may be implemented on various suitable computing device types that are capable of implementing a white space base station. Suitable computing device or devices may include, or be part of, one or more personal computers, servers, server farms, datacenters, combinations of these, or any other computing device(s) capable of storing and executing all or part of a white space base station service.

In addition, white space finder service 104 may also be implemented on various suitable computing device types that are capable of implementing a white space finder service. Suitable computing device or devices may include, or be part of, one or more personal computers, servers, server farms, datacenters, combinations of these, or any other computing device(s) capable of storing and executing all or part of a white space finder service.

Communication network 106 may include one or more of the Internet, wide area networks, local area networks, personal area networks, a combination of these, and others, any or all of which may be wired and/or wireless. White space base station 102 and white space finder service 104 may be coupled to communication network 106 using various communication connections and protocols.

In the illustrative example of FIG. 1, white space base station 102 includes user mode software services 108, kernel software services 110, and radio hardware 112. User mode software services 108 include a spectrum manager 114 having an availability module 116. The availability module 116 is configured to request and receive data regarding locally available, non-interfering white space frequency bands from white space finder service 104 or radio hardware 112. The spectrum manager 114 includes policy module 118 which has one or more policies, such as regulatory policies and technical requirements for wireless transmission by the white space base station. Some or all of such policies may or may not be received from white space finder service 104, or another service. Non-limiting examples of regulatory policies include guard bands requirements, power mask requirements, times that white space frequency bands are available, acceptable transmission power level ranges, and so forth. The technical requirements may include requirements specified by one or more wireless protocols employed by the white space base station 102. Non-limiting examples of such wireless protocol specification requirements include single or multicarrier modulation requirements, power transmission level requirements, duplex/simplex transmission requirements, variable upload/download transmission requirements, and so forth.

Decision module 120—also in spectrum manager 114—is configured to compare the one or more available physical transmission frequency bands received by availability module 116 to the policies of policy module 118, and to select ones of the one or more physical transmission frequency bands suitable for transmission according to the policies. In one non-limiting example, policy module 118 may include a technical requirement for 1 megahertz bandwidth and a regulatory policy requirement to include a 100 kilohertz guard band. Decision module 120 may select one or more of the available physical transmission frequency bands to meet those policy requirements. Decision module 120 may select two or more non-contiguous available physical transmission frequency bands to meet the policy requirements.

User mode software services 108 may include base station service 122 configured to provide a general base station service to wireless clients such as a geo-location service and web caching, access connection manager 124 configured to control user access rights and connectivity, and security manager 126 configured to provide security services of white space base station 102 such as access control lists, authentication, wireless encryption, and so forth.

Kernel software services 110 includes communication module 128, configured to provide a software radio service. Communication module 128 includes spectrum virtualization module 130 configured to provide spectrum virtualization services to one or more wireless transmission protocols 132-M. Wireless transmission protocols 132-M may include media access control ($MAC_M$) layers and physical layers ($PHY_M$) for use with wireless transmission protocols 132-M.

Radio hardware 112 may be implemented as a white-space radio front-end board, or other radio hardware. Such hardware may be for example a WBX from Ettus Research LLC. Radio hardware 112 may include one or more radio transceivers 134-N and sensing hardware 136. One or more radio transceivers 134-N may include radio-front ends which may include analog radio transmission and reception circuitry, antenna(s), analog-to-digital converter (ADC) circuitry, and digital-to-analog converter (DAC) circuitry. Sensing hardware 136 may be configured to probe and/or sense the availability of one or more physical transmission frequency bands according to embodiments. In some embodiments, availability module 116 is configured to query sensing hardware 136 for available frequency bands. Sensing hardware 136 may be a radio transceiver similar to one or more radio transceivers 134-N. In alternate embodiments, a single radio transceiver is configured to act as both a transceiver and a sensing hardware. Various aspects of radio hardware 112 may be reconfigurable to transmit on various frequencies, such as frequencies that cover TV spectrum bands.

Spectrum virtualization module 130 is configured to perform digital modulation. In conventional wireless transmission, digital modulation maps a binary sequence (i.e., a bit stream) to a segment of digital waveform samples, called symbols. At a receiver, the symbols are demodulated to retrieve the embedded binary information. Baseband signals are not suitable to transmit directly; thus an RF front-end is configured to convert the digital baseband samples into high-frequency analog radio signals for transmission. The receiving RF front-end selects the desired radio frequency signals, down-converts the signals, and digitizes them to digital baseband signals.

With reference to the Open Systems Interconnection model (OSI model), PHY layers are analogous to layer 1 protocols and MAC layers are analogous to layer 2 protocols. The spectrum virtualization module can be thought of as implementing a spectrum virtualization layer at layer "0.5" of the OSI model.

One or more wireless transmission protocols 132-M may be conventional protocols. As noted above, conventional wireless transmission protocols may be incompatible with white space frequency bands and may be incompatible with variable or non-contiguous frequency bands. The PHY layers of one or more wireless transmission protocols 132-M modulate baseband signals for transmission on a fixed wireless frequency band, which may be different from the selected white space frequency bands. Spectrum virtualization module 130 treats these fixed wireless frequency bands as "virtual" frequency bands, and the baseband signals modulated by the PHY layers as "virtual" baseband signals, since white space base station 102 does not actually transmit on the fixed wireless frequencies of the PHY layers. Spectrum virtualization module 130 instead reshapes the virtual baseband signals that have been modulated according to the virtual frequency bands into physical baseband signals for transmission over the physical white space transmission bands.

Spectrum virtualization module 130 can be thought of as presenting a "virtual baseband" to one or more wireless transmission protocols 132-M. During transmission, spectrum virtualization module 130 intercepts the virtual baseband signals and performs real-time reshaping of the virtual baseband signals so that the virtual baseband of the PHY layers maps to the physical transmission frequency bands. During reception, spectrum virtualization module 130 intercepts the received physical baseband signals and performs inverse reshaping to create virtual baseband signals for passing to the PHY layers. In various embodiments, spectrum virtualization module 130 enforces the spectrum mapping provided by spectrum manager 114 and allows white space base station 102 to utilize conventional PHY designs without modifications to the PHY standards.

As noted above, availability module 116 may request a list of available physical transmission frequency bands. This request may be sent to white space finder service 104 via communication network 106. White space finder service 104 includes reception module 138 configured to receive the request. The request may be accompanied by a location of white space base station 102. Propagation module 140, in white space finder service 104, is configured to determine, based on a location of a primary spectrum user (such as a television signal transmitter or a licensed wireless microphone user) that is near white space base station 102 and terrain data of a physical area near that location, a geographic area over which transmissions from the primary spectrum user are likely to propagate. Interference determination module 142 is configured to determine, based on the propagation area and the location of white space base station 102, whether transmissions of white space base station 102 will potentially interfere with transmissions of the one or more primary user devices. Based on the results of the interference determination, send module 144 is configured to send one or more locally available, non-interfering physical transmission frequency bands to white space base station 102 that are available for white space base station 102 to use. Alternatively, send module 144 may provide data indicative of physical transmission frequency bands that are not available for use by white space base station 102. Send module 144 may also send one or more policies, such as regulatory policies, for use by decision module 120 in selecting frequency bands for transmission. Send module 144 may also send additional information, such as recommendations for which spectrum band is most beneficially used at the base station.

Some embodiments may allow primary users to volunteer their spectrum for use in white space transmissions. Such primary users can add their spectrum to the white space finder database. Revocation module 146 is configured to receive, from a primary user, a revocation of a voluntarily provided spectrum and to send the revocation to white space base station 102. Upon receiving a revocation of a frequency band that is in use, decision module 120 is configured to select new ones of the physical frequency bands for transmission.

Propagation module 140 and interference determination module 142 together determine one or more physical transmission frequency bands usable by white space base station 102 for non-interfering transmissions. The propagation area and interference determinations may be modeled, in embodiments, using one of various propagation models such as the Longley-Rice radio signal propagation model.

Geographic area inset 148 shows a location of white space base station 102 (marked "BS" in geographic area inset 148) along with the locations of primary user transmission devices (denoted "TR" in FIG. 1) and various physical features such as hills, buildings, and a lake. The shaded area 150 shows an area over which transmissions from TR 152 are likely to propagate. Interference determination module 142 is configured to determine what frequencies that white space base station 102 may transmit on to avoid interfering with the primary users TR. In the illustrative example shown in geographic area inset 148, white space base station 102 is within the propagation area 150, but outside of another transmission propagation area associated with TR 154. Thus, interference determination module 142 may determine that white space base station 102 is allowed to transmit using a frequency utilized by TR 154, but not using a frequency utilized by TR 152. This potentially prevents white space base station 102 from interfering with transmissions by TR 152—even though white space base station 102 is within the modeled propagation area 150—because TR 152 and white space base station 102 would utilize different frequencies. This also potentially prevents white space base station 102 from interfering with TR 154—even though white space base station 102 uses the same frequency band as TR 154—because white space base station 102 is outside of the modeled propagation area associated with TR 154. Propagation module 140 may determine propagation area 150 based on terrain data, such as the existence of the lake and the hill. For example, the hill may shield transmissions from TR 152 and therefore decrease the size of propagation area 150, for example.

Example White Space Base Station

Figure 2:
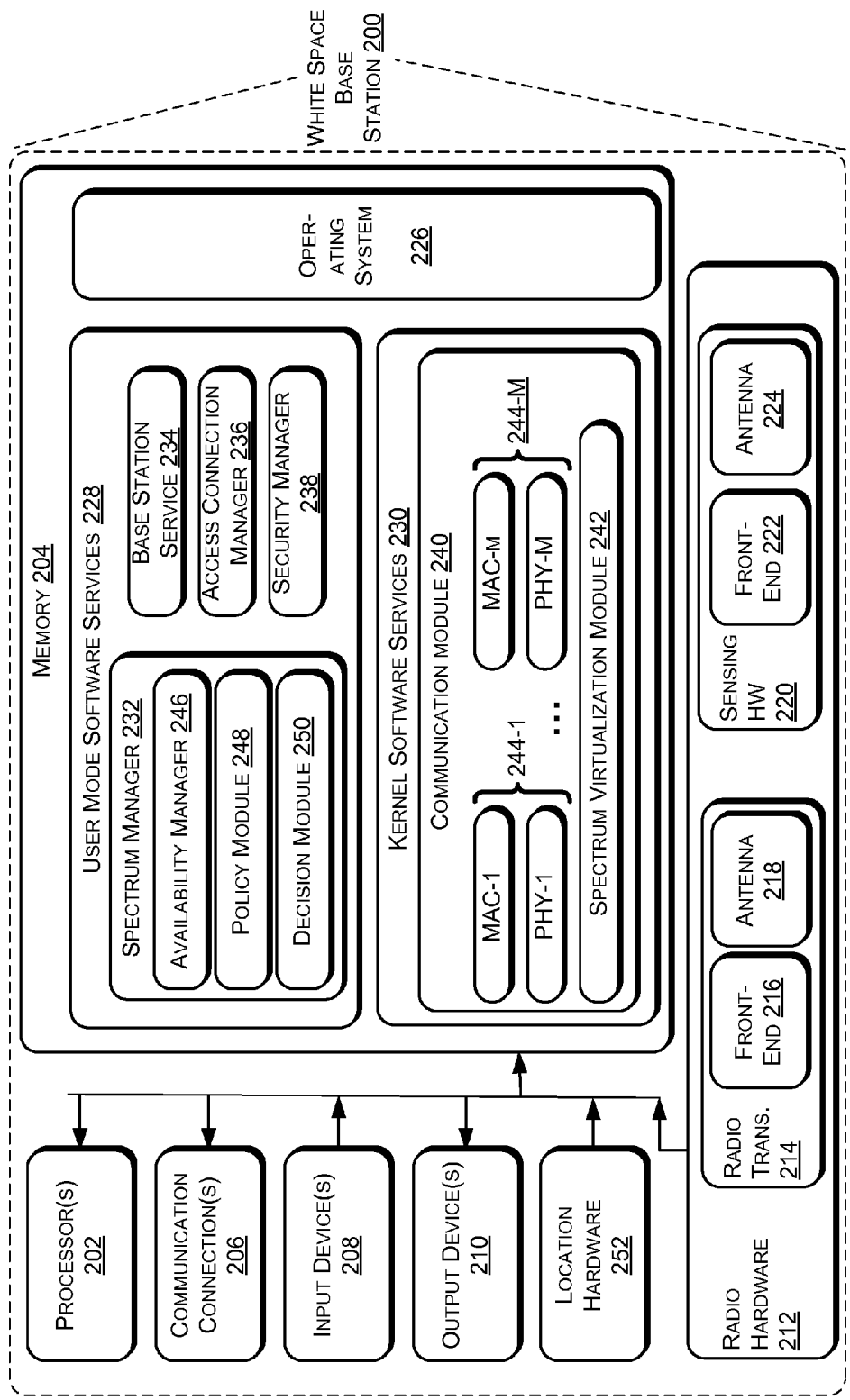
FIG. 2 is a block diagram of an example white space base station.

FIG. 2 is a block diagram of an example white space base station 200. White space base station 200 may be configured as any suitable computing device capable of implementing base station services. According to various non-limiting examples, suitable computing devices may include personal computers (PCs), servers, server farms, datacenters, combinations of these, or any other computing device(s) capable of storing and executing all or part of a white space base station service.

In one example configuration, white space base station 200 comprises one or more processors 202 and memory 204. White space base station 200 may also contain communication connection(s) 206 that allow communications with various devices such as for example white space finder service 104, such as is described in FIG. 1. The white space base station 200 may also include one or more input devices 208, such as a keyboard, mouse, pen, voice input device, touch input device, etc., and one or more output devices 210, such as a display, speakers, printer, etc. coupled communicatively to the processor(s) 202 and memory 204.

White space base station 200 includes radio hardware 212. Radio hardware 212 may be implemented as a white-space radio front-end board, or other radio hardware. Radio hardware 212 includes one or more radio transceivers 214, which include radio frequency (RF) front-ends 216 and antennae 218. Radio hardware 212 may be communicatively coupled to processor(s) 202 and to memory 204. Sensing hardware 220 includes sensing RF front-end 222 and sensing antenna 224. Sensing hardware 220 may be configured to probe for and/or sense available physical frequency bands, such as by looking for TV signals. Sensing RF front-end 222 and sensing antenna 224 may be the same or different from RF front-ends 216 and antennae 218.

The memory 204 may store program instructions that are loadable and executable on the processor(s) 202, as well as data generated during execution of, and/or usable in conjunction with, these programs. In the illustrated example, memory 204 stores an operation system 226, user mode software services 228, and kernel 230 (which may be part of operating system 226). The operating system 226 provides basic system functionality of white space base station 200 and, among other things, provides for operation of the other programs and modules of white space base station 200. User mode software services 228 include a spectrum manager 232, a base station service 234 configured to provide wireless transmission service to wireless clients such a geolocation service and web caching, access connection manager 236 configured to control user access rights and connectivity, and security manager 238 configured to provide security services of white space base station 200 such as access control lists, authentication, wireless encryption, and so forth.

Kernel 230 includes a communication module 240. Communication module 240 includes a spectrum virtualization module 242 configured to interface with radio hardware 212 to transmit radio signals to one or more client devices. Spectrum virtualization module 242 is also configured to interface with one or more wireless transmission protocols 244-M, each including a MAC-M layer and PHY-M layer. As described with reference to FIG. 1, for example, spectrum virtualization layer 242 is configured to present a virtual baseband to the PHY layers of wireless transmission protocols 244-M, shape outgoing virtual baseband signals to physical baseband signals for transmission on radio hardware 212 and to inverse shape incoming physical baseband signals for handling by the PHY layers. This allows conventional PHY protocols to be used for white space transmission without modification.

Spectrum manager 232 includes an availability module 246 configured to request and receive information regarding available white space physical transmission frequency bands. Availability module 246 may be configured to query one or both of sensing hardware 220 and/or a white space finder service for the available frequency bands. Spectrum manager 232 also includes policy module 248 that contains one or more policies such as regulatory policies or transmission requirements. Non-limiting examples of regulatory policies include guard bands requirements, power mask requirements, times that white space frequency bands are available, acceptable transmission power level ranges, and so forth.

The transmission requirements in policy module 248 may include requirements designated by various standards, protocols, specifications and so forth. Non-limiting examples of wireless protocol specification transmission requirements include bandwidth requirements, single or multicarrier modulation requirements, power transmission level requirements, duplex/simplex transmission requirements, variable upload/download transmission requirements, and so forth.

Spectrum manager 232 also includes decision module 250 that may be configured to compare the available physical transmission frequency bands with the policies (such as regulatory policies and/or transmission requirements) in policy module 248 in order to select appropriate ones of the locally-available, non-interfering physical transmission frequency bands that will allow white space base station 200 to conform to the policies. Decision module 250 is also configured to map the selected ones of the available physical transmission frequency bands to the virtual frequency bands employed by spectrum virtualization module 242 and wireless transmission protocols 244. Decision module 250 is configured to make the selection based on a comparison of the policies to the available physical transmission frequency bands. For example, decision module 250 may consider bandwidth requirements of the wireless transmission protocols 244 and guard band requirements of the regulatory policies in selecting ones of the available physical transmission frequency bands for transmission by white space base station 200.

Decision module 250 is configured, in embodiments, to map multiple ones of the selected physical frequency bands to a single virtual spectrum band. This may occur, for example, where no single frequency band is available to meet the bandwidth or other requirements of one or more of the wireless transmission protocols 244-M. The multiple ones of the selected physical frequency bands may be non-contiguous physical frequency bands. Decision module 250 may also map a single physical frequency band to one or more virtual frequency bands. Decision module 250 may be configured to map virtual frequency bands associated with multiple ones of wireless transmission protocols 244-M to one or more physical transmission frequency bands. This allows white space base station 200 to support multiple simultaneous white space transmissions, to multiple white space clients, utilizing different ones of wireless transmission protocols 244-M. One or more of radio transceivers 214 may be utilized to perform the multiple simultaneous transmissions. Some embodiments may have different numbers of radio transceivers 214 and wireless transmission protocols 244. Or stated another way, N (the number of radio transceivers) does not necessarily equal M (the number of wireless transmission protocols supported by communication module 240).

As noted above, availability module 246 may forward the location of white space base station 200 to a service, such as a white space finder service. The location of white space base station 200 may be determined by location hardware 252, which may be operatively coupled to processor(s) 202 and memory 204. Non-limiting examples of location hardware 252 include global positioning system (GPS) receivers, cellular telephone receivers, or others. Alternatively, availability module 246 may be configured to forward manually configured location information. Such manually configured location information may include coordinates such as longitude and latitude or other coordinate types, an address where white space base station is deployed, or other location information. In other alternative embodiments, availability module 246 may be configured to send an identifier of white space base station 200, such as an IP address, a unique identification number, a MAC address, or other to a white space finder service. The white space finder service may be configured to determine the location of the white space base station 200 based on the unique identifier, such as for example where the location of white space base station 200 has been previously provided to the white space finder service.

Although white space base station 200 has been described as employing white space networking, base stations according to embodiments may also employ other DSA networking types.

Example White Space Finder Service

Figure 3:
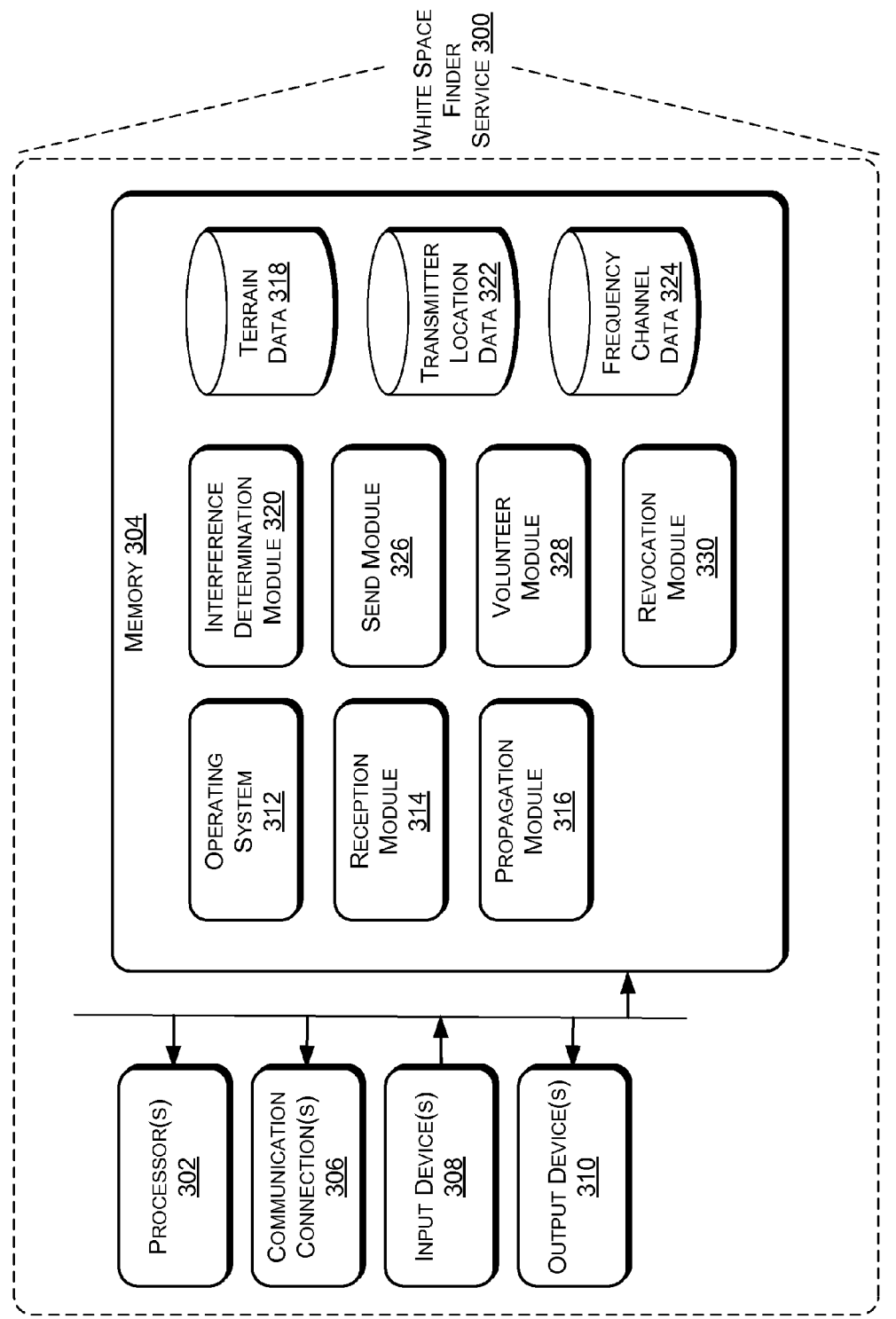
FIG. 3 is a block diagram of an example white space finder service.

FIG. 3 is a block diagram of an example white space finder service 300. White space finder service 300 may be configured as any suitable computing device(s) capable of implementing a white space finder service. According to various non-limiting examples, suitable computing devices may include personal computers (PCs), servers, server farms, datacenters, combinations of these, or any other computing device(s) capable of storing and executing all or part of the white space finder service. White space finder service 300 may be implemented as an Active Server Page (ASP) .Net Web Service.

In one example configuration, white space finder service comprises one or more processors 302 and memory 304. White space finder service 300 may also contain communication connection(s) 306 that allow communications with various devices such as for example a white space base station. The white space finder service 300 may also include one or more input devices 308, such as a keyboard, mouse, pen, voice input device, touch input device, etc., and one or more output devices 310, such as a display, speakers, printer, etc. coupled communicatively to the processor(s) 302 and memory 304.

The memory 304 may store program instructions that are loadable and executable on the processor(s) 302, as well as data generated during execution of, and/or usable in conjunction with, these programs. In the illustrated example, memory 304 stores an operating system 312 to provide basic system functionality of white space finder service 300 and, among other things, provides for operation of the other programs and modules of white space finder service 300.

Memory 304 includes a reception module 314 configured to receive, from one or more white space base stations, location information of the white space base stations along with requests for available physical frequency bands for wireless transmission by the white space base stations. Propagation module 316 is configured to determine one or more geographic areas over which wireless transmissions by one or more primary users are likely to propagate. This determination is based at least on terrain data 318 associated with the locations of one or more primary users (such as television transmitters or licensed wireless microphone users) that are near a white space base station. Interference determination module 320 is configured to determine, based on the location of the white space base station and the modeled geographic propagation areas, one or more locally available, non-interfering transmission frequency ranges that will allow the white space base station to transmit non-interfering signals in its local area. For example, if the white space base station is within a modeled transmission propagation area of a particular primary user, interference determination module 320 may determine that the white space base station would interfere with that particular primary user if the white space base station were to transmit on the same frequency as that particular primary user. Interference determination module 320 is configured to select non-interfering transmission frequency ranges from frequency channel data 324. The propagation area and interference determinations may be modeled, in embodiments, using one of various propagation models such as the Longley-Rice radio signal propagation model. Send module 326 is configured to transmit, to the secondary wireless device, data indicative of the one or more available transmission frequency ranges. Such data may be frequency ranges, center frequencies and bandwidths, channel identifiers, and so forth.

Embodiments may support voluntary provision of spectrum by primary users for use in white space transmissions. Volunteer module 328 is configured to receive voluntary donations of spectrum from donors and to make that spectrum available to white space finder service 300, such as by adding the volunteered spectrum to frequency channel data 324. Such spectrum may be television transmission spectrum, or other spectrum. Revocation module 330 is configured to receive revocations of voluntarily provided spectrum, and to forward revocations of the one or more physical transmission frequency bands to the white space base station.

Although white space finder service 300 has been described as providing available "white space" frequency bands, finder services according to embodiments may also provide lists of frequency bands usable by other DSA networking types.

Use of Location Information

As noted above, location information of a white space base station, such as white space base station 102 illustrated in FIG. 1, or white space base station 200 illustrated in FIG. 2, may be used to determine one or more frequency ranges for white space transmissions. Maintaining private information is important. Therefore, some embodiments take appropriate steps to ensure that an individual cannot be identified from his or her location information. For example, any personally identifying information such as names, usernames, passwords, social security numbers, account numbers, and so forth may be omitted from the request for available white space sent by white space base stations. Furthermore, white space finder services—such as white space finder service 104 illustrated in FIG. 1 and white space finder service 300 illustrated in FIG. 3—may be kept in a secure location and protected against unauthorized access using appropriate measures such as encryption and network access controls. Location information may also be routinely purged. Moreover, users may be provided with notice that their location information is being transmitted, along with information on how their location information will be used. Furthermore, users may be allowed to provide either opt-in or opt-out consent. With opt-in consent, the user takes an affirmative action before his or her location information is used or transmitted. With opt-out consent, the user takes an affirmative action to prevent the use or transmission of his or her location data before that data is collected, transmitted, or used.

Example Process for Frequency Selection by a White Space Base Station

Figure 4:
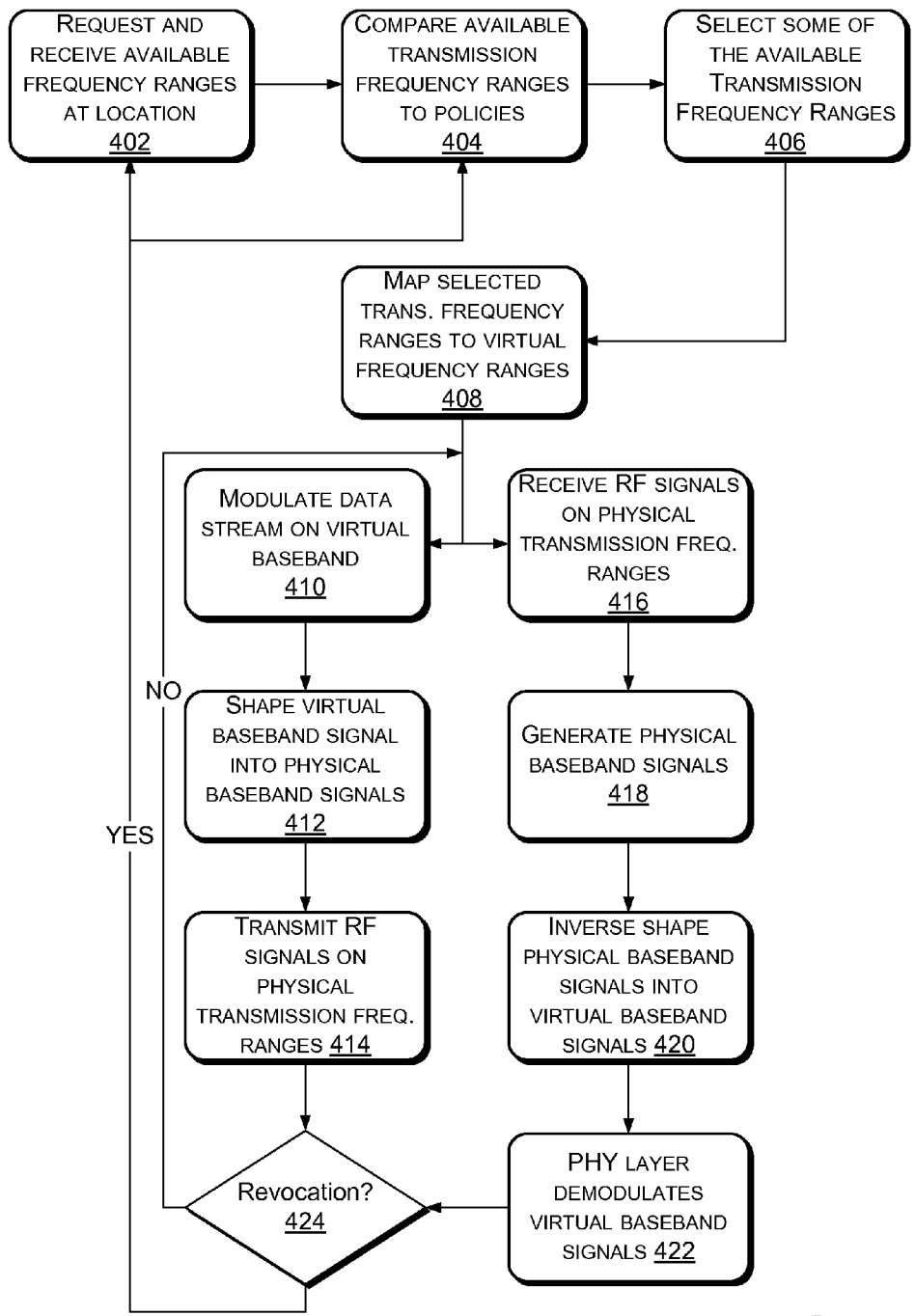
FIG. 4 is a flow diagram showing an example process of frequency selection by a white space base station.

FIG. 4 is a flowchart showing an example process of frequency selection by a white space base station. The process of FIG. 4 may, but may not, be implemented in environment 100 of FIG. 1 and/or using white space base station 200 of FIG. 2. Some portions of the processes shown in FIG. 4 may be implemented by computer-executable instructions. Generally, computer-executable instructions can include routines, programs, objects, components, data structures, procedures, modules, functions, and the like that perform particular functions or that implement particular abstract data types. The processes can also be practiced in a distributed computing environment where functions are performed by remote processing devices that are linked through a communication network. In a distributed computing environment, computer-executable instructions may be located in local and/or remote computer storage media, including memory storage devices.

The exemplary processes are illustrated as a collection of blocks in a logical flow graph representing a sequence of operations that can be implemented in hardware, software, firmware, or a combination thereof. The order in which the processes are described is not intended to be construed as a limitation, and any number of the described process blocks can be combined in any order to implement the process, or alternate processes according to various embodiments of the present disclosure. Additionally, individual blocks may be omitted from the process without departing from the spirit and scope of the subject matter described herein. In the context of software, the blocks represent one or more computer instructions that, when executed by one or more processors, perform the recited operations.

Referring back to FIG. 4, process 400 includes receipt, by a white space device, of one or more non-interfering physical transmission frequency ranges that are available at a location of the white space device, block 402. The white space base station may compare the available physical transmission frequency ranges to one or more policies, block 404. Such policies may include requirements of a wireless transmission protocol or regulatory requirements associated with the physical transmission frequency ranges. Non-limiting examples of policies include guard band requirements, power mask requirements, one or more of bandwidth requirements of the wireless transmission protocol, requirements for single or multicarrier modulation, power transmission masks, duplex or simplex transmission requirements, variable upload and download bandwidth requirements, and so forth. The white space base station selects some or all of the available physical transmission frequency ranges based on the comparison, block 406. The white space base station maps the selected physical transmission frequency ranges to one or more virtual transmission frequency ranges of the wireless transmission protocol, block 408.

During transmission, a PHY layer associated with a wireless transmission protocol may modulate a data stream on a virtual baseband according to a virtual frequency range of the wireless transmission protocol, block 410. The virtual frequency range may be one of several frequency ranges set or established by the wireless transmission protocol for wireless transmissions according to the wireless transmission protocol.

A spectrum virtualization module of the white space base station may shape the virtual baseband signals according to the selected physical transmission frequency ranges to create physical baseband signals, block 412. Radio hardware of the white space base station may transmit radio frequency signals according to the physical baseband signals, block 414. Such transmission may include Digital-to-Analog Conversion (DAC) of the physical baseband signals to analog signals for transmission by the radio hardware.

During reception of white space transmissions from a white space client device, the radio hardware may receive radio frequency signals on the selected physical transmission frequency ranges, block 416. The radio hardware may perform Analog-to-Digital Conversion (ADC) of the received radio frequency signals to generate physical baseband signals, block 418. The spectrum virtualization module of the white space base station inverse shapes the received physical baseband signals into virtual baseband signals, according to the virtual frequency ranges, block 420. The virtual baseband signals are then demodulated by the wireless transmission protocol PHY layer, block 422. The PHY layer extracts the underlying digital information and passes the digital information to higher-level layers of the protocol stack.

Ongoing transmission and reception may proceed in this fashion until a revocation of one or more of the selected physical transmission frequency ranges is received, block 424. Once a revocation is received, an availability module of a spectrum manager of the white space device requests and receives a new list of available physical transmission frequency ranges, block 402. Alternatively, the decision module of the white space device may select another of the previously received list of available physical transmission frequency ranges that have not been revoked, block 404.

By selecting and mapping the physical transmission frequency ranges to the virtual frequency ranges, the white space devices adhere to the non-interference principal of white space transmission. In various embodiments, the white space finder service provides a list of available and non-interfering space frequency ranges for use by the white space base station, as is described in the following section.

Figure 5:
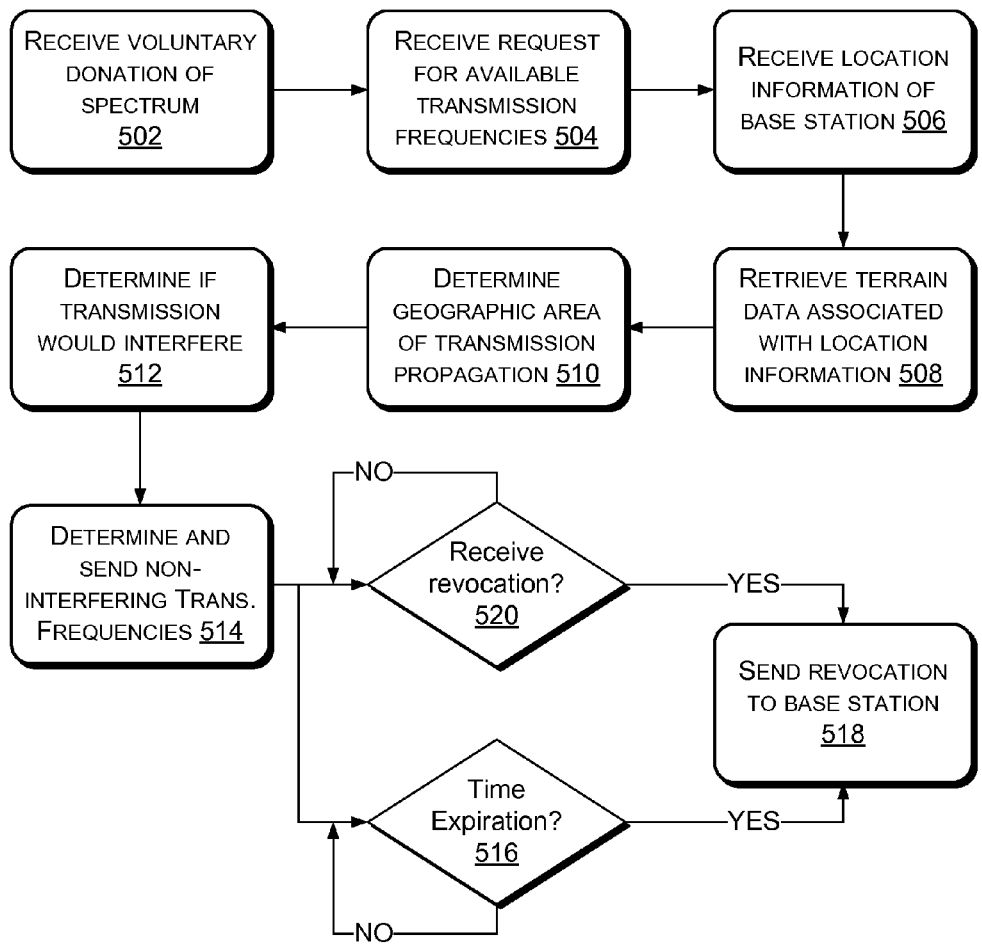
FIG. 5 is a flow diagram showing an example process for determination of location-specific, non-interfering white space frequency by a white-space finder service.

Example Process for Location-Specific Determination of Non-Interfering Frequencies by a White Space Finder Service FIG. 5 is a flowchart showing an example process for determination of location-specific, non-interfering white space frequency ranges by a white-space finder service. The process of FIG. 5 may, but may not, be implemented in environment 100 of FIG. 1 and/or using white space finder service 200 of FIG. 3. Some portions of the processes shown in FIG. 5 may be implemented by computer-executable instructions. Generally, computer-executable instructions can include routines, programs, objects, components, data structures, procedures, modules, functions, and the like that perform particular functions or that implement particular abstract data types. The processes can also be practiced in a distributed computing environment where functions are performed by remote processing devices that are linked through a communication network. In a distributed computing environment, computer-executable instructions may be located in local and/or remote computer storage media, including memory storage devices.

The exemplary processes are illustrated as a collection of blocks in a logical flow graph representing a sequence of operations that can be implemented in hardware, software, firmware, or a combination thereof. The order in which the processes are described is not intended to be construed as a limitation, and any number of the described process blocks can be combined in any order to implement the process, or alternate processes according to various embodiments of the present disclosure. Additionally, individual blocks may be omitted from the process without departing from the spirit and scope of the subject matter described herein. In the context of software, the blocks represent one or more computer instructions that, when executed by one or more processors, perform the recited operations.

Referring back to FIG. 5, process 500 includes receipt of messages indicating voluntary donations of spectrum to be made available in one or more areas covered by the white space finder service, block 502. A reception module receives from a white space base station a request for available physical transmission frequency ranges, block 504. The request may be accompanied by location information of the white space base station, block 506. Alternatively, an identifier of the white space base station may accompany the request and the white space finder service may retrieve previously stored information about the location of the white space base station based on the identifier, which may be in the form of latitude and longitude, global positioning system coordinates, street addresses, or other location information. The identifier may include an IP address, a unique identification number, an email address, or MAC address, or other identifying information.

The white space finder service may retrieve terrain data associated with the location of the white space base station, block 508. The white space finder service determines, based on propagation modeling and locations of one or more primary users (such as television signal transmitters), a geographic area over which the primary users' transmissions are likely to propagate, block 510. The white space finder service will determine, based on the location of the white space base station, whether the white space base station transmissions would potentially interfere with the primary user transmission devices, block 512. For example, if the white space base station is located within the propagation area for a particular primary user, then the white space finder may determine that the white space base station may interfere with the particular primary user if the white space base station were to transmit on the same frequency as the particular primary user. One or more non-interfering physical transmission frequency ranges are determined and sent to the white space base station, block 514. For example, if the white space base station is located within a propagation area of a particular primary user, then the white space finder may determine that it is permissible for the white space base station to transmit on other frequencies besides the frequency ranges that the particular primary user transmits on.

As noted above, white space finder service may be configured to accept voluntary provision of spectrum by holders, licensees, or owners of such spectrum for use in white space transmissions in one or more geographical areas. Such voluntary provision may be limited, such as for example to certain times of day, certain durations, certain dates, and so forth. The white space finder service may therefore determine whether a limit, such as time expiration, has passed, block 516. If so, a revocation of the physical transmission frequency ranges is sent to the white space base station, block 518.

Also, the holder, licensee, or owner of the spectrum may revoke the use of the spectrum in one or more geographical areas, block 520, thereby prompting the white space finder service to transmit a revocation to the white space base station.

Although process 500 has been described as providing available "white space" frequency bands, embodiments may also provide lists of frequency bands usable by other DSA networking types.

Terrain Data and Propagation Modeling Illustration

Figure 6:
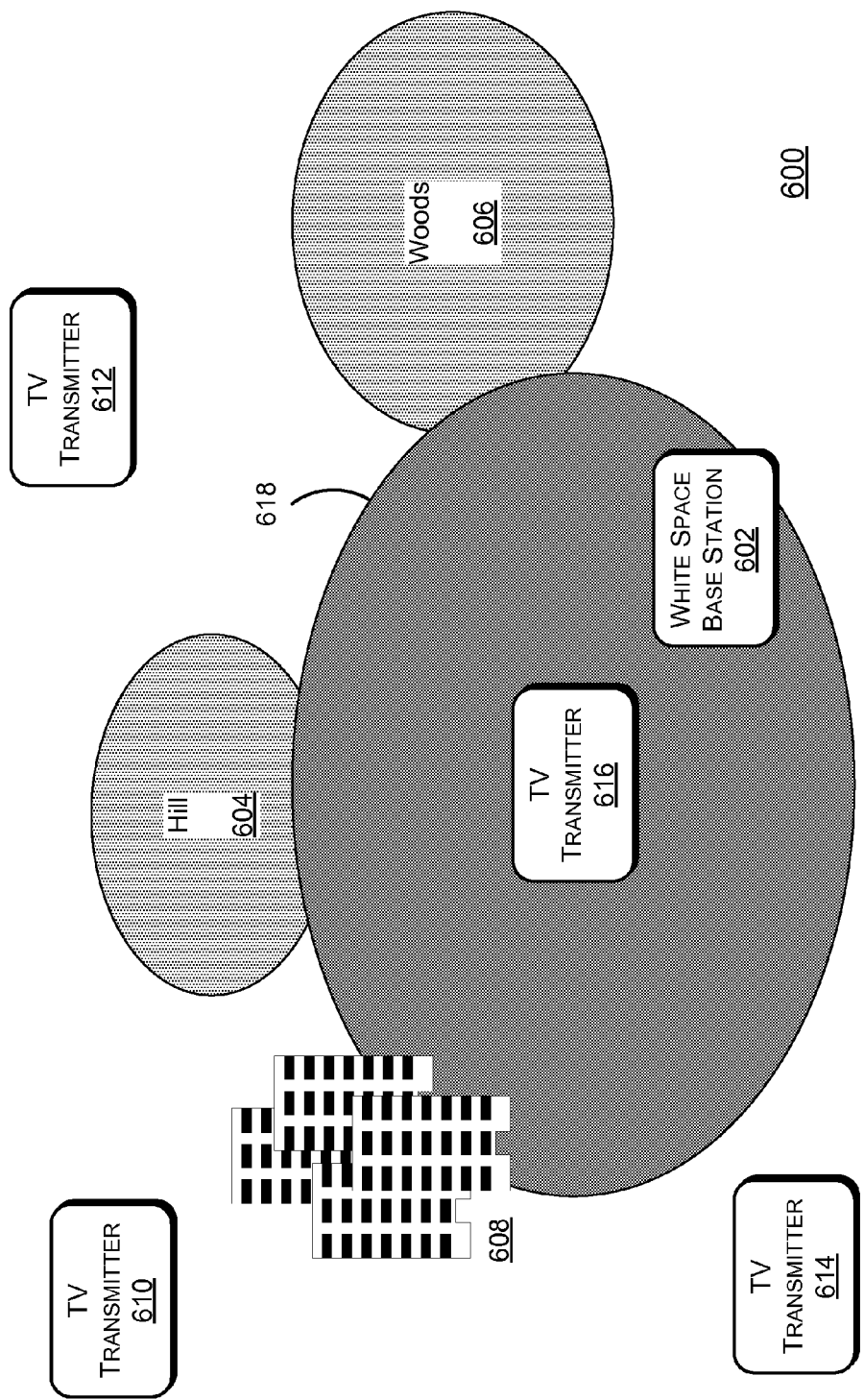
FIG. 6 illustrates a local geographic area of a white space base station, and a modeled propagated area of its transmission signal.

FIG. 6 illustrates a local geographic area of a white space base station, and a visible depiction of the modeled propagation area of its transmission signal. As noted above, a white space finder service models the propagation area of one or more primary user transmitters within a local area of the white space base station. This is done in order to determine whether the white space base station's transmissions would potentially interfere with the primary user transmitters. Such modeling may exist as a digital representation within memory of the white space finder service. As such, the white space finder service need not, although it may, generate and display a visible depiction of the modeled propagation area as illustrated in FIG. 6. FIG. 6 is presented herein primarily for the sake of illustration.

Referring to FIG. 6, terrain map 600 illustrates a local geographic area near white space base station 602. As noted above, a white space finder service may receive location information regarding the location of white space base station 602 and utilize terrain data to determine whether the white space base station's transmission signals might potentially interfere with primary users. In the illustrative example shown in FIG. 6, the terrain data may indicate the presence of hill 604, woods 606, and buildings 608. Based on these and other terrain features, a propagation module of the white space finder service may determine propagation areas over which transmission signals from various primary user devices are likely to propagate. Hill 604, woods 606, and buildings 608 may shorten the distance of transmission signals in certain directions.

Various primary user transmission devices 610-616 are present on terrain map 600, and are near to white space base station 602. One of them, primary user transmission device 616, is shown along with propagation area 610, which is the geographic area that transmissions from primary user transmission device 616 are likely to propagate, based for example on the presence of hill 604, woods 606, and buildings 608, and as determined using propagation modeling. Thus, the white space finder service may select a physical transmission frequency range that is not used by primary user transmission device 616 for white space transmission by white space base station 602. Thus, even though white space base station 602 is within propagation area 610, transmissions by white space base station 602 may be determined to be non-interfering with primary user transmission device 616 because the two utilize different frequency ranges. At the same time, white space base station 602 may be provided with frequency ranges that are also used by primary user transmission device 610, 612, and/or 614 (or other frequency ranges utilized by none of the primary user transmission devices). White space base station 602 may be determined to be sufficiently unlikely to interfere with transmissions from primary user transmission devices 610, 612, and 614—even if white space base station 602 utilizes the same transmission frequencies as those devices—because white space base station 602 is not within the modeled transmission propagation areas of those devices.

Spectrum Virtualization Environment

Figure 7:
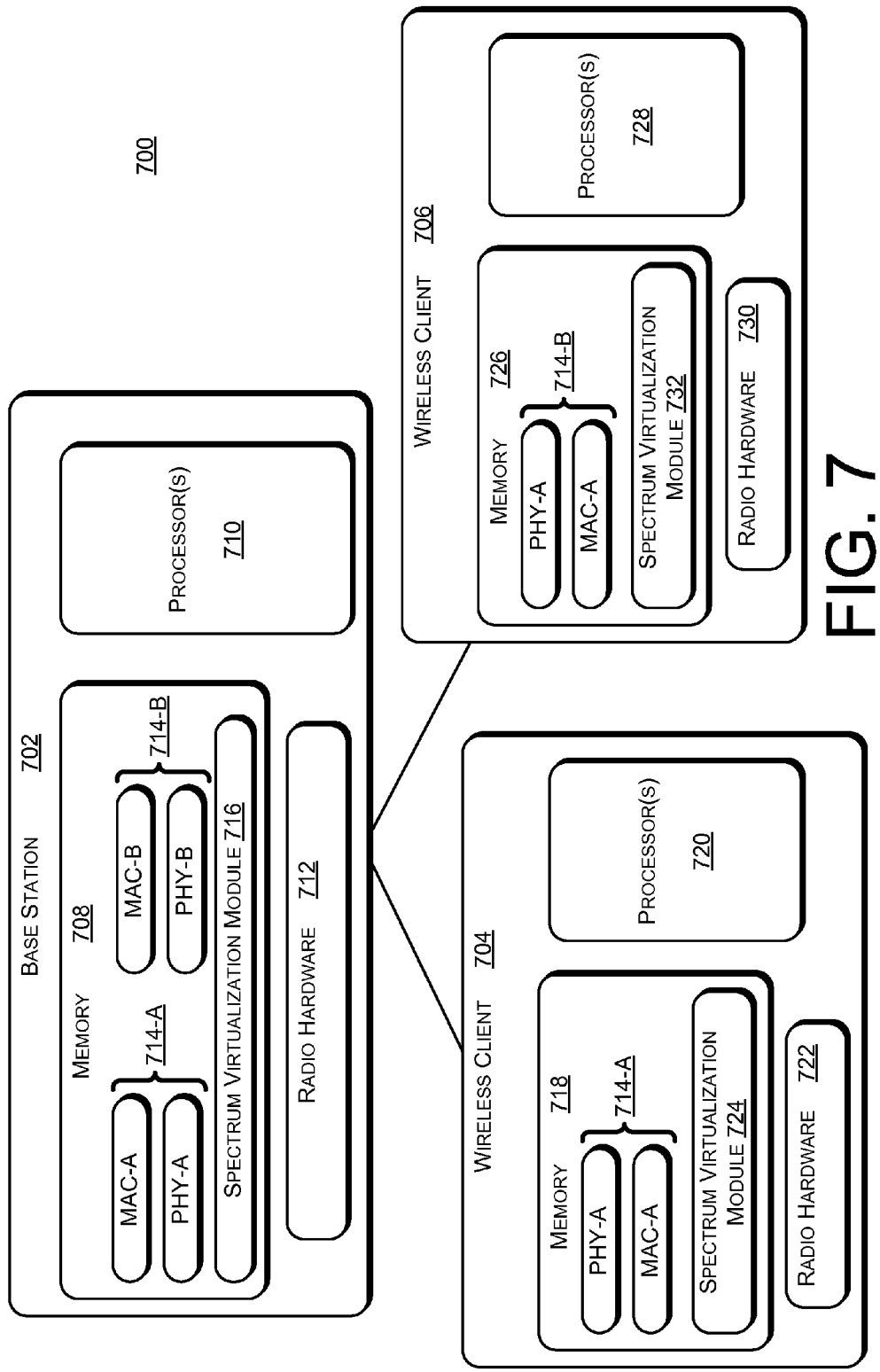
FIG. 7 illustrates a transmission environment including a base station and wireless clients configured to use spectrum virtualization.

FIG. 7 illustrates a transmission environment including a base station and wireless clients configured to use spectrum virtualization. Transmission environment 700 includes base station 702, wireless client 704, and wireless client 706. Base station 702 may be the same or different than white space base station 102 in FIG. 1 and/or white space base station 200 in FIG. 2. Base station 702 may be implemented on various suitable computing device types that are capable of implementing a base station. Suitable computing device or devices may include, or be part of, one or more personal computers, servers, server farms, datacenters, combinations of these, or any other computing device(s) capable of storing and executing all or part of a base station service. Various portions of base station 702 may also be implemented as hardware logic, such as an application specific integrated circuit (ASIC) or as one of various programmable or reprogrammable processor types such as a field programmable gate array (FPGA).

Wireless client 704 and wireless client 706 may be implemented on various suitable computing device types that are capable of implementing a wireless client. Suitable computing device or devices may include, or be part of, one or more personal computers, servers, server farms, datacenters, combinations of these, or any other computing device(s) capable of storing and executing all or part of a wireless client. Various portions of wireless clients 704 and 706 may be implemented as hardware logic, such as an application specific integrated circuit (ASIC) or as one of various programmable or reprogrammable processor types such as a field programmable gate array (FPGA).

Base station 702 includes memory 708 and one or more processors 710. The memory 708 may store program instructions that are loadable and executable on the processor(s) 710, as well as data generated during execution of, and/or usable in conjunction with, these programs. Base station 702 also includes radio hardware 712, which may include a radio frequency (RF) front-end and antennae.

Memory 708 includes wireless protocols 714-A and 714-B. Wireless protocol 714-A includes MAC-A and PHY-A, and wireless protocol 714-B includes MAC-B and PHY-B.

Non-limiting examples of wireless protocols 714-A and 714-B include Wi-Fi®, protocols within the 802.11 suite of protocols, and ZigBee.

Memory 708 also includes spectrum virtualization module 716, configured to implement a spectrum virtualization layer. Spectrum virtualization module 716 is configured to, among other things, map virtual frequency bands to physical frequency bands, and to interface between radio hardware 712 and wireless protocols 714-A and 714-B.

Wireless client 704 includes memory 718 and one or more processors 720. The memory 718 may store program instructions that are loadable and executable on the processor(s) 720, as well as data generated during execution of, and/or usable in conjunction with, these programs. Wireless client 704 also includes radio hardware 722, which may include a radio frequency (RF) front-end and antennae.

Memory 718 includes wireless protocol 714-A, for communication with base station 702. Memory 718 also includes spectrum virtualization module 724, configured to implement a spectrum virtualization layer. Spectrum virtualization module 724 is configured to, among other things, map virtual frequency bands to physical frequency bands, and to interface between radio hardware 722 and wireless protocol 714-A.

Wireless client 706 includes memory 726 and one or more processors 728. The memory 726 may store program instructions that are loadable and executable on the processor(s) 728, as well as data generated during execution of, and/or usable in conjunction with, these programs. Wireless client 706 also includes radio hardware 730, which may include a radio frequency (RF) front-end and antennae.

Memory 726 includes wireless protocol 714-B, for communication with base station 702. Memory 726 also includes spectrum virtualization module 732, configured to implement a spectrum virtualization layer. Spectrum virtualization module 732 is configured to, among other things, map virtual frequency bands to physical frequency, and to interface between radio hardware 730 and wireless protocol 714-B.

As opposed to a conventional wireless system—where PHY layers interface directly with an RF front-end—embodiments of the present disclosure employ spectrum virtualization modules (such as spectrum virtualization modules 716, 724, and 732 in FIG. 7) to create an intermediate interface between the PHY layers and a RF front-end. This interface can be thought of as level 0.5 of the Open Systems Interconnections (OSI) model, directly below layer 1 (the Physical Layer, abbreviated "PHY" herein"). Reference to the OSI model, and to various layers within the OSI model, are not meant to imply that embodiments are compatible only with wired or wireless transmission protocols that conform to the OSI model. Rather, the OSI model and its various layers are referenced herein for the sake of discussion.

When transmitting to wireless client 704, spectrum virtualization module 716 of base station 702 is configured to accept virtual baseband signals modulated by wireless protocol 714-A, shape the virtual baseband modulated signals, and map them to a physical baseband according to a spectrum map. Spectrum virtualization module 716 is configured to pass the shaped and mapped modulated signals to radio hardware 712 for transmission as analog signals on the physical frequency spectrum to wireless client 704.

Radio hardware 722 of wireless client 704 is configured to select the physical frequency spectrum, receive the transmitted analog signals, digitize them, and pass them to spectrum virtualization module 724. Spectrum virtualization module 724 is configured to inverse shape and map the physical baseband modulated signals into virtual baseband modulated signals. Wireless protocol 714-A of wireless client 704 accepts the inverse shaped modulated virtual baseband signals, demodulates them, and extracts the digital data contained within for processing by higher-level layers of the protocol stack.

Wireless client 706 is configured to perform functions that are similar to the functions that wireless client 704 is configured to perform. But wireless client 706 employs wireless protocol 714-B rather than wireless protocol 714-A. In alternate embodiments, different wireless clients could utilize the same wireless protocols, and different wireless clients could utilize the same physical transmission bands as one another.

Spectrum Virtualization Overview

Various embodiments of the present disclosure "virtualize" a non-variant spectrum band out of the dynamic changing physical spectrum allocation in dynamic spectrum access (DSA) networks. (White space networks are examples of DSA networks). Embodiments of the present disclosure support various wireless PHY protocols without the need to change the design of those various wireless PHY protocols. Embodiments accomplish this by using a spectrum virtualization layer situated logically below the wireless PHY layer to perform baseband processing on the baseband signals that are output by the PHY layer. The spectrum virtualization layer intercepts and rewrites digital signals that pass between the baseband presented by the PHY layer and the radio frequency (RF) front-end hardware—in both send and receives directions—to hide the dynamically changing spectrum allocation of the DSA network and to create the effect of a fixed spectrum from the perspective of the PHY protocol.

Next, a conventional radio transceiver and conventional wireless protocol PHY layer will be described. That description will be followed by a description of how spectrum virtualization layers according to embodiments that interface with the PHY layer and the radio transceiver.

A conventional radio transceiver includes a radio frequency (RF) front-end and a baseband processing unit. In conventional radio designs, baseband processing is generally performed in the digital domain with digital signal samples, and the RF front-end mainly contains analog radio circuitry. Thus, analog-to-digital conversion (ADC) and digital-to-analog conversion (DAC) form the nature of the interface between the conventional baseband unit and the RF front-end. The conventional baseband unit performs digital baseband modulation on information bits to create digital baseband waveforms, and vice versa. Digital modulation maps a binary sequence to segments of digital waveform samples. These segments are called symbols. At the receiver side, the symbols are demodulated to retrieve the embedded binary information. The RF front-end converts the digital baseband signals (the symbols) into analog radio signals and transmits them. During reception, the RF front-end selects the radio frequency signal, down-converts the signals, and digitizes the signals to form digital baseband samples.

Different conventional wireless PHY protocols use different modulation techniques. Generally speaking, baseband modulation can be classified into single carrier modulation (SCM) and multi-carrier modulation (MCM). ZigBee, 802.11b and Wideband Code Division Multiple Access (WCDMA) are examples of single carrier systems. Various high-speed wireless systems such as 802.11a/g and Long Term Evolution (LTE) use multi-carrier modulation. In addition to being classifiable by their modulation techniques, conventional wireless PHY protocols can also be classified by how they handle multi-path fading. For example, rake-receiver is commonly used for SCM signals that have been spread. But protocols that utilize MCM often rely on cyclic-prefixes (CP) to remove the impact of multi-path fading. The fundamental tradeoffs in various conventional wireless PHY design choices—such as MCM versus SCM, and Rake-receiver versus CP—make it unlikely that a single PHY layer protocol could be adopted for all wireless applications.

A spectrum virtualization layer, according to various embodiments of the present disclosure, is one way to support multiple conventional PHY layers in a DSA network in order to maintain flexibility for various wireless transmission bands. The interworking between a spectrum virtualization layer according to embodiments and a radio frequency front-end will now be described.

Figure 8:
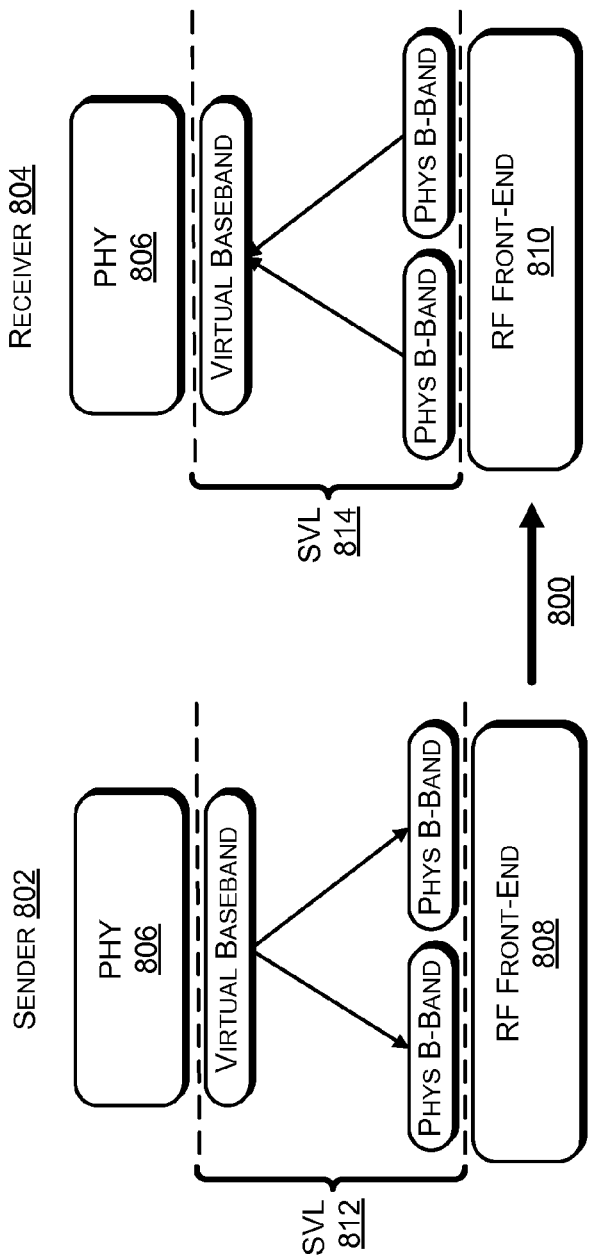
FIG. 8 illustrates an interworking between a radio frequency front-end, the spectrum virtualization layer, and a physical layer during transmission between a sender and a receiver.

FIG. 8 illustrates the interworking between a radio frequency front-end, the spectrum virtualization layer, and a physical layer during transmission between a sender and a receiver. Transmission 800 is between sender 802 and receiver 804. Sender 802 and receiver 804 both employ wireless PHY protocol 806, which may be one of various PHY protocols such as are described within this Detailed Description. Sender 802 and/or receiver 804 may also employ one or more other PHY protocols. Sender 802 may be a base station such as base station 702 in FIG. 7, a wireless client, such as wireless clients 704 and 706 in FIG. 7, or another device type. Sender 802 employs RF front-end 808, and receiver 804 employs RF front-end 810. Sender 802 employs spectrum virtualization layer (SVL) 812, and receiver 804 employs SVL 814.

Referring to sender 802, SVL 812 maps a virtual baseband associated with a "virtual" frequency band or spectrum to one or more physical basebands (shown as "phys b-band" in FIG. 8) that are associated with a physical frequency band or spectrum. The virtual frequency band may be a fixed spectrum (or one of several fixed spectrums) designated by PHY 806, while the physical baseband may be according to one of several dynamically allocated frequency bands, such as in a white space network or, more generally, a DSA network. SVL 812 is configured to map and shape virtual baseband signals to one or more physical baseband signals. RF front-end 808 is configured to convert the digital physical baseband signals to analog signals, and to transmit them on one or more antennae (not shown).

RF front-end 810 of receiver 804 is configured to receive the analog signals transmitted by RF front-end 808, and to convert them into digital samples to form one or more physical basebands. SVL 814 is configured to map and inverse shape the physical baseband signals to virtual baseband signals, before passing them along to PHY 806 of receiver 804. PHY 806 of receiver 804 demodulates the virtual baseband signals and extracts the underlying digital data sent by sender 802. In this way, SVL 812 presents PHY 806 of sender 802 with a virtual baseband according to a fixed frequency (which may be specified by PHY 806), and SVL 814 presents PHY 806 of receiver 804 with a virtual baseband, according to the same fixed frequency. Thus PHY 806 of sender 802 and PHY 806 of receiver 804 communicate with one another as if sender 802 and receiver 804 were transmitting on the fixed frequency. But SVLs 812 and 814 make it possible to transmit using one or more physical frequency bands that have been allocated dynamically for the transmission. The dynamically allocated physical frequency bands may be different from the fixed frequency employed by PHY 806.

Both sender 802 and receiver 804 may be capable of sending and receiving. They are referred to as "sender" and "receiver" in FIG. 8 for the sake of description. Thus, transmissions can be sent from receiver 804, via SVL 814 and RF front-end 810, to sender 802 via RF front-end 808 and SVL 812.

A spectrum virtualization layer (such as SVL 812 and SVL 814 of FIG. 8) may be configured to create a bridge between PHY protocols and the dynamic baseband in a DSA network (such as a white space network). PHY protocols are usually designed for a fixed frequency transmission, and DSA networks may have a time and space-varying spectrum configuration. The dynamic baseband in a DSA network may also be wider or narrower than the fixed frequency baseband of the PHY protocols. The SVL allows the fixed frequency band of the PHY protocols to be mapped to a narrower or wider frequency band.

Another function of the spectrum virtualization layer is to decouple the connection between the PHY protocol and the RF front-end, and to add a layer of indirection. The virtual baseband and the physical baseband differ in the sense that one is fixed and specified by PHY protocol design, and the other is dynamic and determined by a DSA allocation method (such as for example by the processes employed by white space finder services and spectrum managers in accordance with various embodiments of the present disclosure). At the sender side, the PHY protocol generates digital waveforms as if it were connected to an RF front-end. The SVL layer intercepts these samples and reshapes them into a different waveform shapes so that, when the RF front-end transmits the transformed waveform shapes, the resultant radio signals match the dynamic spectrum allocation of the DSA or white space network. At the receiver side, the SVL performs the inverse reshaping operation on the physical baseband samples to recover the original digital waveform shapes for the PHY layer. As shown in the example of FIG. 8, a relatively wide virtual baseband is reshaped into two relatively narrow physical basebands during transmission. During reception (such as by receiver 804), the SVL inverse reshapes the two relatively narrow physical basebands into the one relatively wide virtual baseband.

Spectrum Virtualization Architecture

Figure 9:
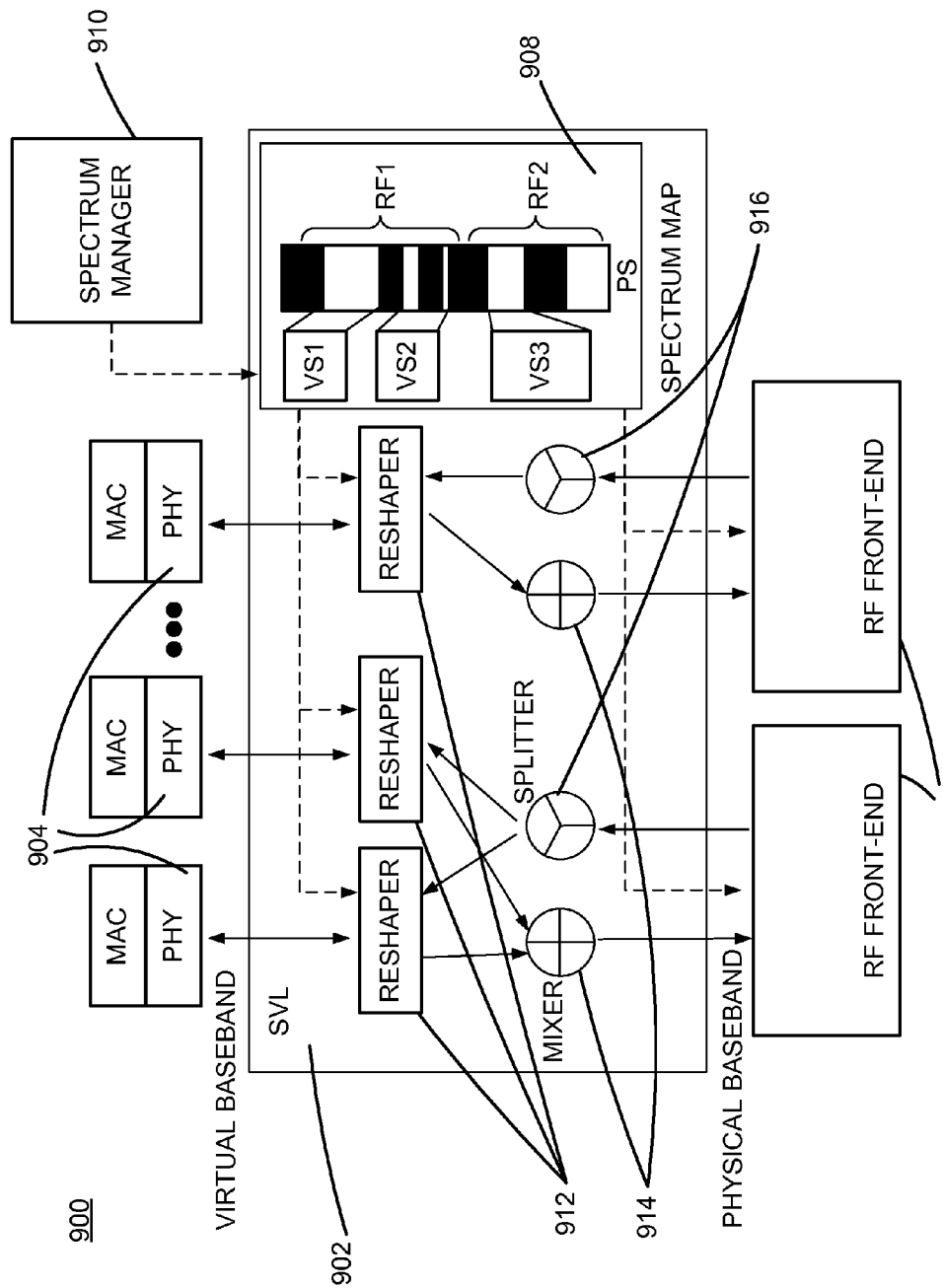
FIG. 9 illustrates a block diagram of a spectrum virtualization layer architecture.

FIG. 9 illustrates a block diagram of a spectrum virtualization layer architecture 900. Portions of architecture 900 may be implemented as a software module configured to execute on one or more processors, as is described elsewhere within this Detailed Description. In alternative embodiments, architecture 900 may be implemented on an Application Specific Integrated Circuit (ASIC), or on one of various programmable or reprogrammable processor types, such as Field Programmable Gate Arrays (FPGA) or others. Architecture 900 may be employed by a wireless base station, such as white space base station 102 of FIG. 1, white space base station 200 of FIG. 2, and/or base station 702 of FIG. 7. Architecture 900 may also be employed on a wireless client, such as wireless clients 704 and 706 of FIG. 7.

SVL 902 provides a virtual baseband to one or more PHY 904 and is configured to dynamically translate the signals between a virtual baseband and a physical baseband provided by one or more RF front-ends 906. The width of the virtual baseband is specified by one or more PHY 904, such as for example during an initialization stage. The one or more PHY 904 may be part of a wireless transmission protocol that also specifies a media access control (MAC) layer, as shown in FIG. 9.

SVL 902 maintains a spectrum map 908 showing the mapping between the virtual baseband and the physical spectrum bands. The mapping contained in spectrum map 908 is flexible. For example, spectrum map 908 may map the virtual baseband to a physical spectrum band having the same width (e.g., the mapping of virtual spectrum band VS1 to an equal-sized physical band). Alternatively, spectrum map 908 may map the virtual baseband to a narrower contiguous physical band, or several non-contiguous physical bands (e.g., the mapping of virtual spectrum bands VS2 and VS3 to differently sized physical bands). In other embodiments, spectrum map 908 may map the virtual baseband to a broader contiguous physical band, or sever non-contiguous physical bands that together are larger than the virtual baseband.

Spectrum allocation is controlled by spectrum manager 910. Spectrum manager 910 may be the same as or different than spectrum manager 114 in FIG. 1 and/or spectrum manager 232 in FIG. 2. Spectrum manager 910 is configured to monitor the current spectrum usage (e.g., by sensing or querying a database such as a white space finder service), to allocate available physical spectrum bands for one of PHY 904 based on various policies, and to update the spectrum map 908 in SVL 902.

The one or more reshapers 912 are configured to translate signals from baseband to physical bands, and vice versa. The one or more reshapers are configured to perform signal translation without reference to the modulation scheme employed by the one or more PHY 904. In embodiments, one or more reshapers 912 are configured to employ digital signal processing algorithms that operate on general baseband waveforms.

The one or more reshapers 912 may be transparent to one or more PHY 904. For example, although the reshaping operation may change the baseband waveform in some way, the one or more PHY 904 may treat this distortion as if it were due to normal wireless channel fading. This allows the one or more PHY 904 to model the distortion caused by the reshaping operation by an equivalent multipath fading channel, and to handle any distortion caused by the reshaping operation using equalization mechanisms already available to the one or more PHY 904.

After reshaping, baseband signals are converted to physical baseband signals. Physical baseband signals from multiple ones of PHY 904 may be mixed (added) together by mixers 914 before they are sent to RF front-ends 906.

When receiving, the incoming signals are passed to splitters 916, which contain a matched filter for the one or more PHY 904 based on spectrum map 908. The filtered physical band signals are fed to the reshapers 912, which are configured to perform inverse reshaping operations to recover the virtual baseband signals. Virtual baseband signals are sent to the one or more PHY 904. The PHY 904 are configured to demodulate the virtual baseband signals and to obtain the underlying binary information.

Conceptually, SVL 902 virtualizes the RF front-ends 906 for each of the one or more PHY 904. SVL 902 is configured to flexibly map different ones of PHY 904 to different ones of RF front-ends 906. Also, SVL 902 is configured to multiplex several ones of PHY 904 onto a single one of RF front-ends 906. RF front-end virtualization allows multiple ones of PHY 904 to share a common one of RF front-ends 906. RF front-end virtualization may therefore reduce the bandwidth resources needed for multi-radio integration, thereby requiring less space and energy, and possibly resulting in lower-cost mobile devices.

Figure 10:
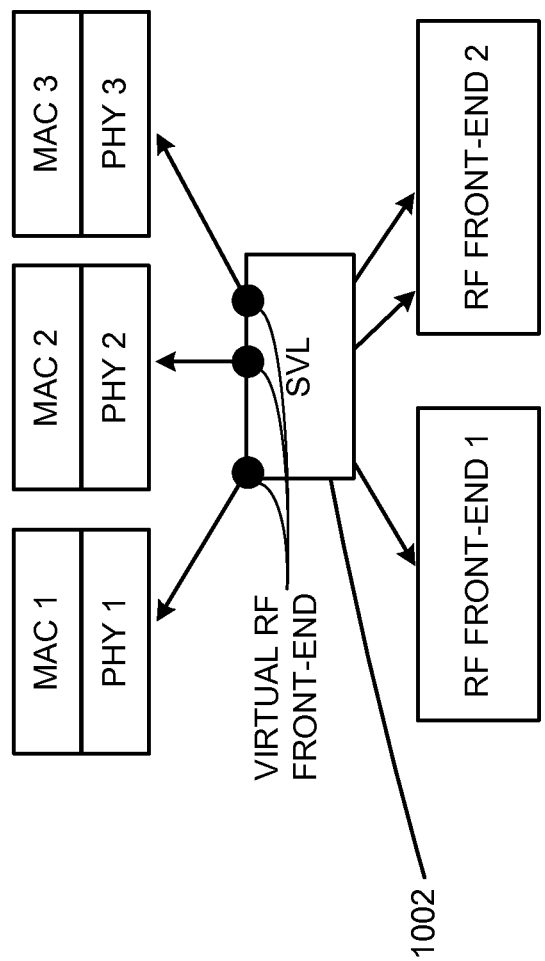
FIG. 10 illustrates a spectrum virtualization layer configured to map different wireless transmission protocols to different radio front-ends.

FIG. 10 illustrates a spectrum virtualization layer configured to map different wireless transmission protocols to different radio front-ends. SVL 1002 presents a virtual baseband to PHY 1, PHY 2, and PHY 3. SVL 1002 also presents a physical baseband to RF Front-end 1 and RF Front-end 2 as shown in FIG. 10. SVL 1002 is shown in FIG. 10 mapping reshaped modulated baseband signals from PHY 1 to RF Front-end 1. SVL 1002 is also—in the configuration shown in FIG. 10—shown mixing reshaped modulated baseband signals from PHY 2 and PHY 3 together, and mapping those mixed signals to RF Front-end 2. Such mapping and mixing may be, for example, based on a spectrum map as is described elsewhere within this Detailed Description.

Spectrum Virtualization Layer Interfaces

Figure 11:
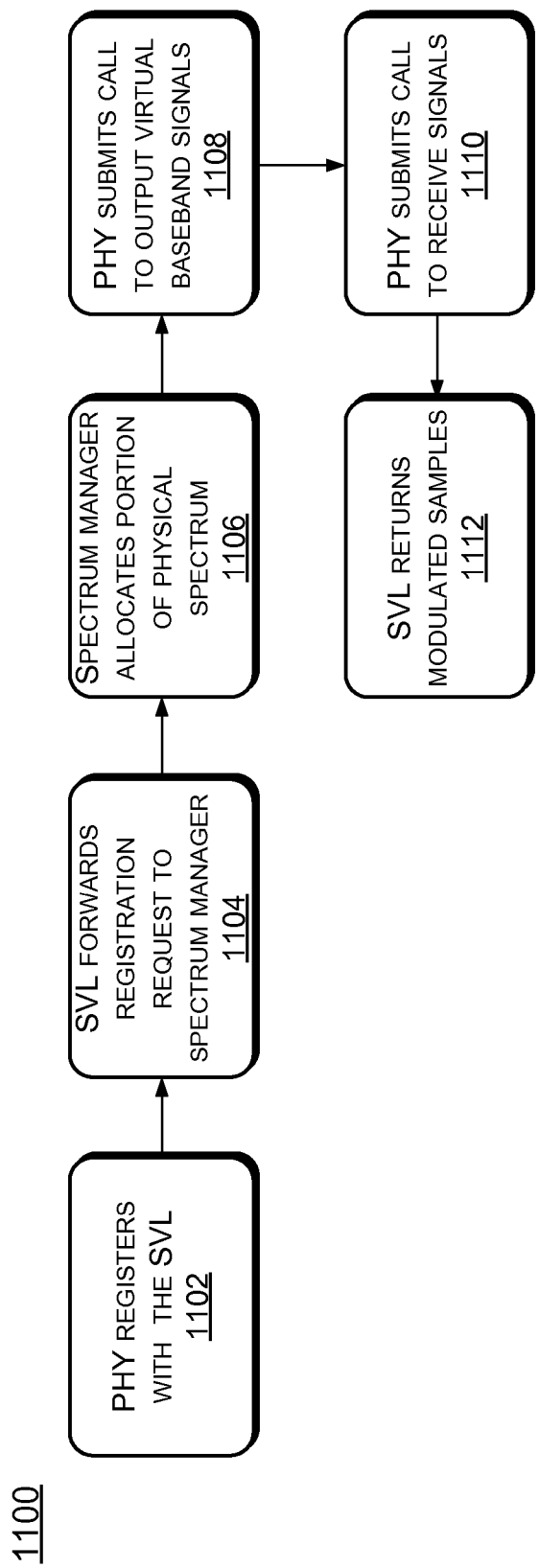
FIG. 11 is a flow diagram showing an example process for interface calls to a spectrum virtualization layer.

Spectrum virtualization layers according to various embodiments define interfaces. FIG. 11 is a flow diagram showing an example process 1100 for interface calls to a spectrum virtualization layer. The process of FIG. 11 may, but may not be implemented in, or in conjunction with, the communication module 128 in FIG. 1, communication module 240 of FIG. 2, transmission 800 of FIG. 8, environment 700 of FIG. 7, architecture 900 of FIG. 9, and/or SVL 1002 and PHY layers shown in FIG. 10.

Some portions of the processes shown in FIG. 11 may be implemented by computer-executable instructions. Generally, computer-executable instructions can include routines, programs, objects, components, data structures, procedures, modules, functions, and the like that perform particular functions or that implement particular abstract data types. The processes can also be practiced in a distributed computing environment where functions are performed by remote processing devices that are linked through a communication network. In a distributed computing environment, computer-executable instructions may be located in local and/or remote computer storage media, including memory storage devices.

The exemplary processes are illustrated as a collection of blocks in a logical flow graph representing a sequence of operations that can be implemented in hardware, software, firmware, or a combination thereof. The order in which the processes are described is not intended to be construed as a limitation, and any number of the described process blocks can be combined in any order to implement the process, or alternate processes according to various embodiments of the present disclosure. Additionally, individual blocks may be omitted from the process without departing from the spirit and scope of the subject matter described herein. In the context of software, the blocks represent one or more computer instructions that, when executed by one or more processors, perform the recited operations.

Referring back to FIG. 11, a wireless PHY protocol registers with the SVL before it sends and receives signal samples, block 1102. During registration, the wireless PHY protocol defines a virtual spectrum band, a desired bandwidth for the baseband, and one or more over-sample parameters. The over-sample parameters, together with the desired bandwidth, determine the sampling rate of the baseband. The sampling rate may be at least twice the bandwidth, in order to satisfy Nyquist criteria. It is possible for a wireless PHY to specify an over-sampling rate greater than two, which may provide better performance but incur greater computational cost. This greater computational cost results from the additional samples that are processed in a given interval when over-sampling is used. The wireless PHY will also, during registration, define a number of sub-carriers used in multi-carrier modulation. For single carrier modulation, this number will be equal to one.

Another parameter specified during registration describes the sorts of reshape operations to be performed on the virtual baseband signals of the PHY. This parameter will work together with the spectrum manager to determine mapping between the virtual baseband and the physical spectrum bands. Some non-limiting examples include parameters that indicate that the baseband signals are not to be shrunk to a physical baseband that is narrower than the specification, parameters that indicate that baseband signals are not to be split into non-contiguous physical bands, and parameters that indicate additional guard-band sizes that are to be used.

The SVL forwards the registration request to the spectrum manager, block 1104. If accepted, the spectrum manager allocates a portion of physical spectrum and updates the map entries in the spectrum map, block 1106. The SVL may return a handle to the PHY that identifies the registered virtual baseband.

A wireless PHY submits a call to output virtual baseband signals to the SVL, block 1108. As part of the call, the wireless PHY provides an identification of the virtual baseband, which prompts a look-up to the spectrum map for the physical spectrum. The wireless PHY provides sample and length parameters that specify a pointer to the digital samples to be output, and the number of digital samples to be output, respectively.

The wireless PHY submits a call to receive baseband signals, block 1110. During this call, the wireless PHY provides an identification of the virtual baseband, a pointer to the sample buffer location, and the number of digital samples to be received. The SVL returns the samples identified by those parameters and passes them to the wireless PHY, block 1112.

Spectrum Map

As noted above, a spectrum map is employed to determine the mapping between the physical spectrum bands and the virtual spectrum bands. For each PHY, the table defines a virtual spectrum $B^V(f,w)$ and the associated (mapped) physical spectrum band $B^P(f,w)$, where f is the center frequency and w is the bandwidth. A virtual spectrum band may be associated with (mapped to) multiple bands $B^P_1(f_1,w_1)$, $B^P_2(f_2,w_2)$ ... $B^P_n(f_n,w_n)$ in embodiments where a virtual spectrum range is mapped to multiple physical spectrum ranges. A map table of the spectrum map contains the processing information associated with the PHY layers. Non-limiting examples of processing information includes a reshaper identifier, a filter identifier (identifying a splitter), a radio identifier (identifying a radio, such as for example in embodiments employing more than one radio in a device), and a time scale factor (for use in timing virtualization as discussed below). The spectrum map may be established and maintained by a spectrum manager. Once a registration request has been accepted by the spectrum manager (as described elsewhere within this Detailed Description), the spectrum manager assigns a PHY identifier to the registered PHY and adds a new entry to the map table. As discussed elsewhere within this Detailed Description, a spectrum virtualization layer enforces the map table.

Timing Virtualization

When an SVL maps a virtual baseband to a physical band with a narrower width, it takes more time to transfer baseband signals than a PHY protocol would expect. For example, if an 802.11a PHY with a 20 MHz virtual baseband is mapped to a 10 MHZ physical baseband, it may take the SVL 8 μs to send a symbol instead of the 4 μs as expected by the PHY. These changes in timing may impact the operation of the wireless protocols if the wireless protocols rely on absolute time information. For example, Network Allocation Vector (NAV) and ACK timeout would expire pre-maturely if the transmitting time of PHY signal is extended. Embodiments therefore employ timing virtualization.

Figure 12:
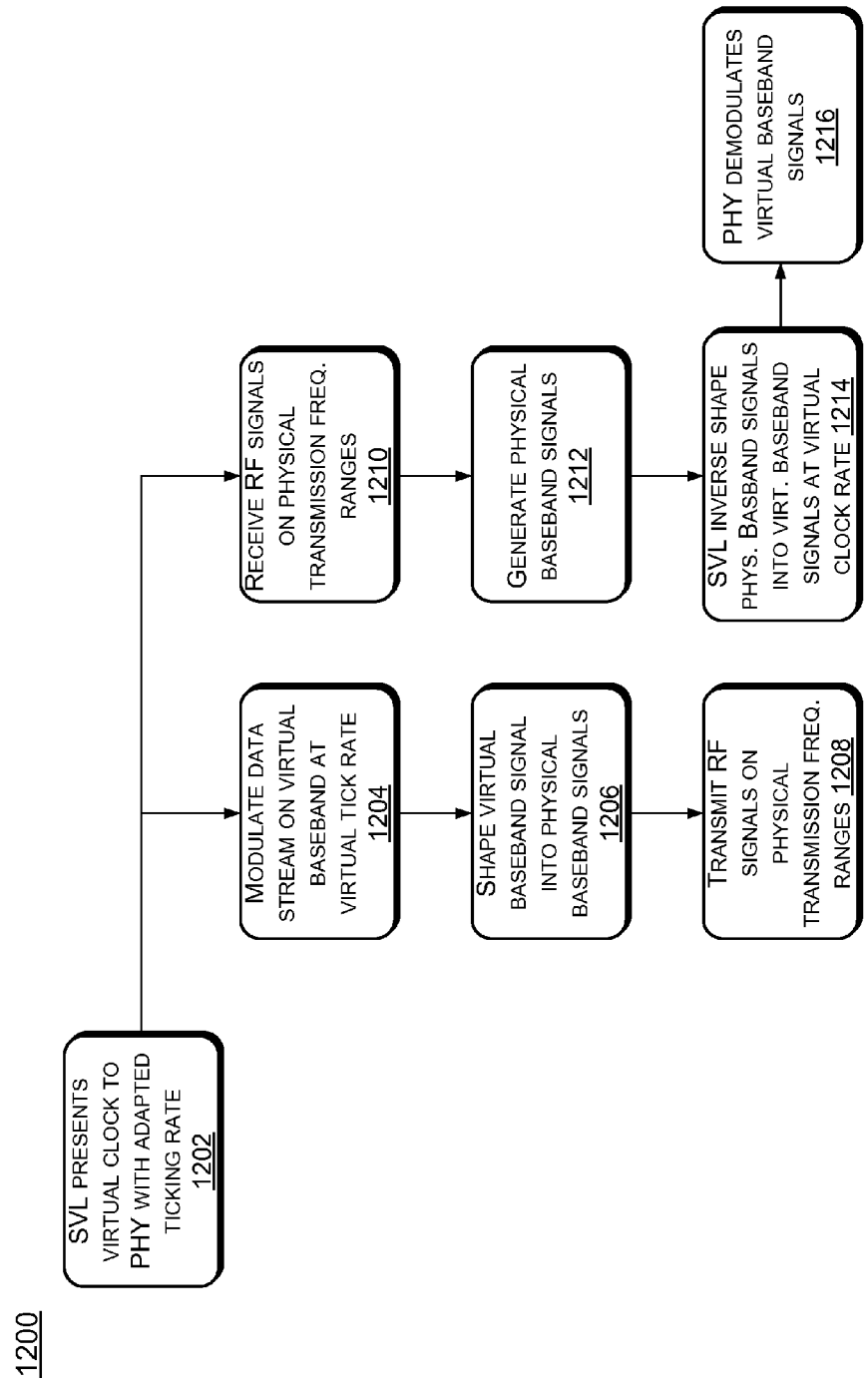
FIG. 12 is a flow diagram showing an example process for timing virtualization.

FIG. 12 is a flow diagram showing an example process 1100 for timing virtualization. The process 1200 of FIG. 12 may, but may not, be implemented in the communication module 128 in FIG. 1, communication module 240 of FIG. 2, transmission 800 of FIG. 8, environment 700 of FIG. 7, architecture 900 of FIG. 9, and/or SVL 1002 in FIG. 10. Some portions of the processes shown in FIG. 12 may be implemented by computer-executable instructions. Generally, computer-executable instructions can include routines, programs, objects, components, data structures, procedures, modules, functions, and the like that perform particular functions or that implement particular abstract data types. The processes can also be practiced in a distributed computing environment where functions are performed by remote processing devices that are linked through a communication network. In a distributed computing environment, computer-executable instructions may be located in local and/or remote computer storage media, including memory storage devices.

The exemplary processes are illustrated as a collection of blocks in a logical flow graph representing a sequence of operations that can be implemented in hardware, software, firmware, or a combination thereof. The order in which the processes are described is not intended to be construed as a limitation, and any number of the described process blocks can be combined in any order to implement the process, or alternate processes according to various embodiments of the present disclosure. Additionally, individual blocks may be omitted from the process without departing from the spirit and scope of the subject matter described herein. In the context of software, the blocks represent one or more computer instructions that, when executed by one or more processors, perform the recited operations.

Referring back to FIG. 12, in process 1200, an SVL employing timing virtualization presents a virtual clock to the wireless protocol (PHY), block 1202. The ticking rate of the virtual clock is adaptive according to the actual allocated physical spectrum bands. In one non-limiting example, if $b_s$ is the aggregated bandwidth of allocated physical bands, and $b_v$ is the width of virtual baseband, then the SVL adjusts the ticking rate by a factor of $b_s/b_v$.

During transmission, the PHY protocol modulates a data stream on a virtual baseband according to the virtual transmission frequency range, utilizing the virtual clock ticking rate, block 1204. The virtual clock ticking rate can be thought of as slowing time down for the PHY protocol, thereby allowing the PHY protocol to be used with the narrower physical baseband without modification of the PHY protocol. In other embodiments, the virtual clock ticking rate may be faster than normal, in order to allow the virtual spectrum band to be mapped to a relatively larger physical spectrum band in order to speed up transmissions without modification of the PHY protocol.

During transmission, the SVL shapes the virtual baseband signal into physical baseband signals according to the physical transmission frequency range, block 1206. The SVL passes the modulated physical baseband signals to the radio front-end for transmission on the physical transmission frequency ranges, block 1208.

During reception, the RF front-end receives RF signals on the physical transmission frequency ranges, block 1210. The RF front-end digitizes the received analog signals and generates physical baseband signals to be sent to the SVL, block 1212.

The SVL inverse shapes the received physical baseband signals into virtual baseband signals, and sends them to the PHY protocol according to the virtual clock tick rate, block 1214. The PHY protocol demodulates the signal, and extracts the underlying digital data, block 1216.

Timing virtualization may require MAC and other high layer protocols to be modified in order to get timing information only from the virtual clock. Many MAC implementations have common clock application programming interfaces (APIs) that refer to a single clock source. Therefore, embodiments re-implement these clock API functions. For wireless protocols that have not been modified to support timing virtualization, a policy can be set to ensure that its physical frequency band can be implemented in order to avoid the problem altogether. Such a policy would cause the SVL to allocate enough physical bands to ensure that signal timing does not need to change.

RF Front-End Multiplexing

Spectrum virtualization according to various embodiments may support the multiplexing of multiple PHY onto a single wideband RF front-end. An SVL may ensure that the width of the wideband RF front-end accommodates the width of physical bands allocated to the multiple PHY. The SVL includes mixers and splitters to support multiple PHY multiplexing.

A mixer may sit in the transmitting chain, and be configured to collect the physical baseband signals of the multiple PHY (after reshaping), scale the signals' amplitudes according to individual ones of the PHYs' power masks, and then add (mix) the physical baseband signals together prior to sending them to a DAC in the RF front-end. A splitter contains a set of band-pass filters that match a physical band that has been allocated to the multiple PHYs. For PHYs that have been mapped to noncontiguous physical bands, filters for all the noncontiguous bands are combined by the mixer to form a single band-selective filter. The splitter applies a matched band-selective filter for each PHY, and the filtered signal samples are fed to the corresponding reshaper that has been mapped to the respective PHY.

If a base station or wireless client device has only one RF front-end, and that one RF front-end is half-duplex, multiplexing multiple PHY may include careful scheduling, since a half-duplex RF front-end can only transmit or receive at any one time. Thus, the SVL may schedule the signals for multiple PHYs to be transmitted simultaneously, and the SVL may schedule the signals for multiple PHYs to be received simultaneously. To accommodate these scheduling requirements, SVLs according to embodiments include buffers to temporarily hold baseband samples when the RF front-end is receiving. The SVL defers the transmissions until the receiving is done (i.e. upon detection of no signal power on the receive chain of the RF front-end). The SVL can hide the resulting buffering latency from the PHY layers by subtracting the latency from the virtual time, such as by reducing a tick rate of a virtual clock.

A full-duplex mode can be achieved with a full-duplex RF front-end, or by attaching two half-duplex RF front-ends to the SVL. In embodiments, the sending and receiving bands may be orthogonal and one or more analog notch (band-stop) filters may be applied by the SVL to filter out self-transmitted signals in order to prevent the receiving chain from being saturated.

Computer-Readable Media

Depending on the configuration and type of computing device used, memory 204 of white space base station 200 in FIG. 2, memory 304 of white space finder service 300 in FIG. 3, memory 708 of base station 702 in FIG. 7, and/or memories 718 and 726 of wireless clients 704 and 706 in FIG. 7 may include volatile memory (such as random access memory (RAM)) and/or non-volatile memory (such as read-only memory (ROM), flash memory, etc.). Memories 204, 304, 708, 718, and/or 726 may also include additional removable storage and/or non-removable storage including, but not limited to, flash memory, magnetic storage, optical storage, and/or tape storage that may provide non-volatile storage of computer readable instructions, data structures, program modules, and other data for white space base station 200, white space finder service 300, base station 702, and/or wireless clients 704 and 706.

Memories 204, 304, 708, 718, and 726 are examples of computer-readable media. Computer-readable media includes at least two types of computer-readable media, namely computer storage media and communications media.

Computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer-readable instructions, data structures, program modules, or other data in a modulated data signal, such as a carrier wave, or other transmission mechanism. As defined herein, computer storage media does not include communication media.

Conclusion

Although the disclosure uses language specific to structural features and/or methodological acts, the invention is not limited to the specific features or acts described. Rather, the specific features and acts are disclosed as illustrative forms of implementing the invention.

What is claimed is:

1. A method of spectrum virtualization, the method comprising:

providing a virtual clock to a physical layer associated with a first transmission spectrum, the virtual clock rate based at least on a first width of the first transmission spectrum and on a second width of a second transmission spectrum;

receiving, from the physical layer of a base station and at a spectrum virtualization module of the base station, a virtual baseband signal modulated by the physical layer at the first transmission spectrum;

converting, at the spectrum virtualization module, the virtual baseband signal to a first physical baseband signal in a whitespace transmission band of the second transmission spectrum and according to a spectrum map, the spectrum map associating white space frequency bands available in a geographic area of the base station with one or more virtual frequency bands;

providing, at the spectrum virtualization module and to a radio transceiver of the base station, the first physical baseband signal;

converting, at the spectrum virtualization module, a second physical baseband signal from the radio transceiver to a second virtual baseband signal at the first transmission spectrum; and
providing the second virtual baseband signal to the physical layer;
transmitting, by the radio transceiver, the first physical baseband signal to a receiver.

2. The method that claim 1 recites, wherein the first transmission spectrum is a contiguous first transmission spectrum, and the second transmission spectrum includes a plurality of discontiguous portions, wherein the converting the virtual baseband signal to a first physical baseband signal includes translating a first portion of the contiguous first transmission spectrum to a first one of the plurality of discontiguous portions of the second transmission spectrum, and translating a second portion of the contiguous first transmission spectrum to a second one of the plurality of discontiguous portions of the second transmission spectrum.

3. The method that claim 1 recites, wherein the converting the virtual baseband signal to a first physical baseband signal includes translating, based on the spectrum map, the virtual baseband signals to at least one of a narrower contiguous physical band or a plurality of non-contiguous physical bands of the second transmission spectrum.

4. The method that claim 1 recites, further comprising, adding together two or more physical baseband signals of the corresponding physical baseband signals to form a single physical baseband signal; and
transmitting the single physical baseband signal to the receiver.

5. A system comprising:
a processing unit;
radio hardware;
a computer-readable medium operatively coupled to the processing unit and having a plurality of modules stored thereon, the plurality of modules executable by the processing unit to perform acts comprising:
providing a virtual clock to a physical layer associated with a first transmission spectrum, the virtual clock rate based at least on a first width of the first transmission spectrum and on a second width of a second transmission spectrum;
receiving, from the physical layer of a base station, a virtual baseband signal modulated by the physical layer at the first transmission spectrum;
converting the virtual baseband signal to a first physical baseband signal in a whitespace transmission band of the second transmission spectrum and according to a spectrum map, the spectrum map associating white space frequency bands available in a geographic area of the base station with one or more virtual frequency bands;
providing, to a radio transceiver of the base station, the first physical baseband signal;
converting a second physical baseband signal from the radio transceiver to a second virtual baseband signal at the first transmission spectrum; and
providing the second virtual baseband signal to the physical layer;
the radio hardware configured to:
convert the first physical baseband signal to an analog signal; and
transmit the analog signal via one or more antennae.

6. The system that claim 5 recites, wherein the acts comprise, based on the at least one physical layer protocol, modulating the data on a particular virtual baseband according to a virtual frequency range of a wireless transmission protocol.

7. The system as claim 6 recites, wherein one or more physical basebands are narrower than the particular virtual baseband.

8. The system as claim 6 recites, wherein the one or more physical basebands are broader that the particular virtual baseband.

9. The system as claim 5 recites, wherein the acts further comprise:
monitoring current usage of a plurality of physical basebands;
allocating available ones of the plurality of physical basebands for mapping the virtual baseband signal; and
updating the spectrum map to reflect an allocation of the available ones of the plurality of physical basebands.

10. The system as claim 5 recites, wherein the acts further comprise:
further translating at least two virtual baseband signals to create at least two physical baseband signals; and
combining the at least two physical baseband signals.

11. The system as claim 10 recites, wherein the acts further comprise combining the at least two physical baseband signals by scaling signal amplitudes associated with individual ones of the at least two physical baseband signals based at least in part on individual physical protocol masks.

12. The system as claim 5 recites, wherein the acts further comprise:
receiving a request to register the at least one physical layer protocol, the request including at least a virtual spectrum band and an associated bandwidth;
assigning a physical protocol identifier to the at least one physical layer protocol; and
updating the spectrum map to include the at least one physical layer protocol.

13. The system as claim 5 recites, wherein the one or more physical basebands comprise one of a plurality of dynamically allotted frequency bands that include at least a white space network, or a dynamic spectrum access (DSA) network.

14. A system, comprising:
radio frequency (RF) hardware configured to
provide a first physical baseband signal in a white space transmission band to a communication module;
a processing unit; and
a computer-readable medium operatively coupled to the processing unit and having the plurality of modules thereon, the plurality of modules including the communication module;
the communication module configured to, upon execution by the processing unit:
provide a virtual clock to a physical layer associated with a first transmission spectrum, the virtual clock rate based at least on a first width of the first transmission spectrum and on a second width of a second transmission spectrum;
receive, from the physical layer of the system, a virtual baseband signal modulated by the physical layer at the first transmission spectrum;
convert the virtual baseband signal to a second physical baseband signal in the whitespace transmission band of the second transmission spectrum and according to a spectrum map, the spectrum map associating white space frequency bands available in a geographic area of the base station with one or more virtual frequency bands;

provide, to the radio hardware the second physical baseband signal;
convert the first physical baseband signal from the radio hardware to a second virtual baseband signal at the first transmission spectrum;
providing the second virtual baseband signal to the physical layer and demodulate the second baseband signal to extract underlying binary data.

15. The system as claim 14 recites, wherein the communication module is further configured to, upon execution by the processing unit:
map the first virtual baseband signal to a plurality of non-contiguous physical bands of the one or more physical basebands.

16. The system as claim 14 recites, wherein the communication module is further configured to, upon execution by the processing unit:
provide the first physical baseband signal received from the RF hardware through one or more splitters to create a plurality of filtered physical baseband signals, wherein individual splitters of the one or more splitters include a filter that corresponds to an individual physical layer protocol of one or more physical layer protocols; and
translating the plurality of filtered physical baseband signals.

17. The system as claim 14 recites, wherein the communication module is further configured to, upon execution by the processing unit:
monitor current usage of a plurality of physical spectrum bands;
allocate available ones of the plurality of physical spectrum bands for mapping the particular virtual baseband signal based at least in part on predetermined policies; and
update the spectrum map to reflect an allocation of the available ones of the plurality of physical spectrum bands.

* * * * *